(12) United States Patent
Tsutsumi et al.

(10) Patent No.: US 7,690,475 B2
(45) Date of Patent: Apr. 6, 2010

(54) VEHICLE STEERING CONTROL APPARATUS AND METHOD

(75) Inventors: Junji Tsutsumi, Fujisawa (JP); Toshiaki Kasahara, Kouza-gun (JP)

(73) Assignee: Nissan Motor Co., Ltd., Yokohama (JP)

( * ) Notice: Subject to any disclaimer, the term of this patent is extended or adjusted under 35 U.S.C. 154(b) by 502 days.

(21) Appl. No.: 11/707,941

(22) Filed: Feb. 20, 2007

(65) Prior Publication Data
US 2007/0215405 A1   Sep. 20, 2007

(30) Foreign Application Priority Data
Mar. 3, 2006   (JP) ............... 2006-057271

(51) Int. Cl.
*B62D 5/00* (2006.01)
(52) U.S. Cl. .................. 180/402; 180/405
(58) Field of Classification Search ............ 180/402, 180/405
See application file for complete search history.

(56) References Cited

U.S. PATENT DOCUMENTS

| | | | |
|---|---|---|---|
| 6,279,675 B1 * | 8/2001 | Bohner et al. | 180/403 |
| 6,913,107 B2 * | 7/2005 | Sato et al. | 180/402 |
| 6,926,112 B2 * | 8/2005 | Husain et al. | 180/402 |
| 6,929,086 B1 * | 8/2005 | Husain et al. | 180/413 |
| 7,004,279 B2 * | 2/2006 | Shitamitsu et al. | 180/402 |
| 7,007,769 B2 * | 3/2006 | Hara et al. | 180/402 |
| 7,174,987 B2 * | 2/2007 | Husain | 180/402 |
| 7,322,439 B2 * | 1/2008 | Hara et al. | 180/402 |
| 7,469,768 B2 * | 12/2008 | Chino et al. | 180/405 |
| 7,526,372 B2 * | 4/2009 | Tsutsumi et al. | 701/43 |
| 2004/0262072 A1 * | 12/2004 | Hara et al. | 180/402 |
| 2007/0131476 A1 * | 6/2007 | Kubokawa et al. | 180/444 |

FOREIGN PATENT DOCUMENTS

| | | |
|---|---|---|
| EP | 0983926 A2 | 3/2000 |
| EP | 1787892 A1 | 5/2007 |
| EP | 1795429 A1 | 6/2007 |
| JP | 2005-096745 | 4/2005 |

* cited by examiner

*Primary Examiner*—Lesley Morris
*Assistant Examiner*—Michael R Stabley
(74) *Attorney, Agent, or Firm*—Global IP Counselors, LLP

(57) ABSTRACT

A vehicle steering control apparatus includes a steering wheel to be operated by a driver, a steering mechanism for turning the front wheels in accordance with an operating torque of the steering wheel, and a clutch for mechanically connecting the steering wheel to the steering mechanism. A clutch engagement command issuing section is provided for issuing an engagement command to the clutch when the clutch is disengaged and a condition for engaging the clutch is satisfied. A clutch engagement determining section is provided for determining that the clutch is in an engaged state when an increase in torque is detected at the steering wheel after the engagement command has been issued to the clutch.

16 Claims, 12 Drawing Sheets

VEHICLE STEERING CONTROL APPARATUS AND METHOD

CROSS-REFERENCE TO RELATED APPLICATIONS

This application claims priority to Japanese Patent Application No. 2006-057271, filed on Mar. 3, 2006. The entire disclosure of Japanese Patent Application No. 2006-057271 is hereby incorporated herein by reference.

BACKGROUND OF THE INVENTION

1. Field of the Invention

The present invention generally relates a vehicle steering control apparatus for a steer-by-wire system provided with a clutch for mechanically connecting and disconnecting a driver operating unit configured to be operated by a driver and a steering unit configured to steer a steered wheel to and from each other.

2. Background Information

In conventional steer-by-wire (SBW) systems in which the steering wheel and the steering mechanism of the front wheels are mechanically separated from each other, a clutch is provided as a backup mechanism for mechanically connecting the steering wheel and the steering mechanism. When a problem (failure) occurs in a portion of the SBW system, the clutch is connected immediately and the SBW control is aborted. If, for example, the reaction force actuator fails, once the steering wheel starts moving due to operation by the driver, the steering wheel will rotate easily until the clutch is completely engaged. Also until engagement of the clutch, a normal steering actuator will continue to operate in accordance with the rotary operation of the steering wheel, i.e., in accordance with the steering wheel angle value detected by a steering wheel angle sensor. Thus, the steered wheels may turn much more sharply than the driver intends causing an undesirable vehicle behavior. In order to prevent the undesirable vehicle behavior, the control gain of the steering actuator is lowered or set to zero for a prescribed amount of time in order to restrict the operation of the steering actuator during the period from when the failure is detected until the clutch is connected. The prescribed amount of time is set in advance to a value that accurately reflects the time required for the clutch to connect (engage). The prescribed amount of time is determined by experimentally measuring the clutch engagement (connection) time and using, for example, the largest value from among a plurality of data. One example of this type of conventional vehicle steering control apparatus is disclosed in Japanese Laid-Open Patent Publication No. 2005-096745).

In view of the above, it will be apparent to those skilled in the art from this disclosure that there exists a need for an improved vehicle steering control apparatus. This invention addresses this need in the art as well as other needs, which will become apparent to those skilled in the art from this disclosure.

SUMMARY OF THE INVENTION

With the conventional technology just described, the steering angle is held constant during the prescribed period that the clutch is estimated to be in the process of becoming engaged. If the actual time required for the clutch to engage is shorter than the prescribed amount of time, then the steering angle will remain held even after the clutch is connected. Consequently, during the period from when the clutch actually engages until the prescribed amount of time elapses, the steering wheel will be connected directly to the steered wheels through the clutch and a reaction force will develop which holds the steering wheel in place, resulting in an unnatural steering feel for the driver.

The present invention was conceived in view of the problem just described. One object is to provide a vehicle steering control apparatus that can accurately determine when the clutch has actually engaged regardless of variations in the clutch engagement time and smoothly shift to a steering wheel operation mode immediately after the clutch has actually engaged.

In order to achieve the aforementioned object, a vehicle steering control apparatus in accordance with the present invention comprises a driver operating unit, a steering unit, an operating torque detector, a clutch, a clutch engagement command issuing section and a clutch engagement determining section. The driver operating unit is configured to be operated by a driver. The steering unit is arranged to be mechanically separated from the driver operating unit and configured to turn at least one steered wheel in response to an operating state from the driver operating unit. The operating torque detector operable to detect the operating torque applied to the driver operating unit. The clutch operable to mechanically connect and disconnect the driver operating unit and the steering unit to and from each other. The clutch engagement command issuing section configured to issue an engagement command to the clutch when the clutch is disengaged and a clutch engaging condition is satisfied. The clutch engagement determining section configured to determine that the clutch is in an engaged state upon detecting an increase in the operating torque applied to the driver operating unit after the engagement command has been issued to the clutch.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
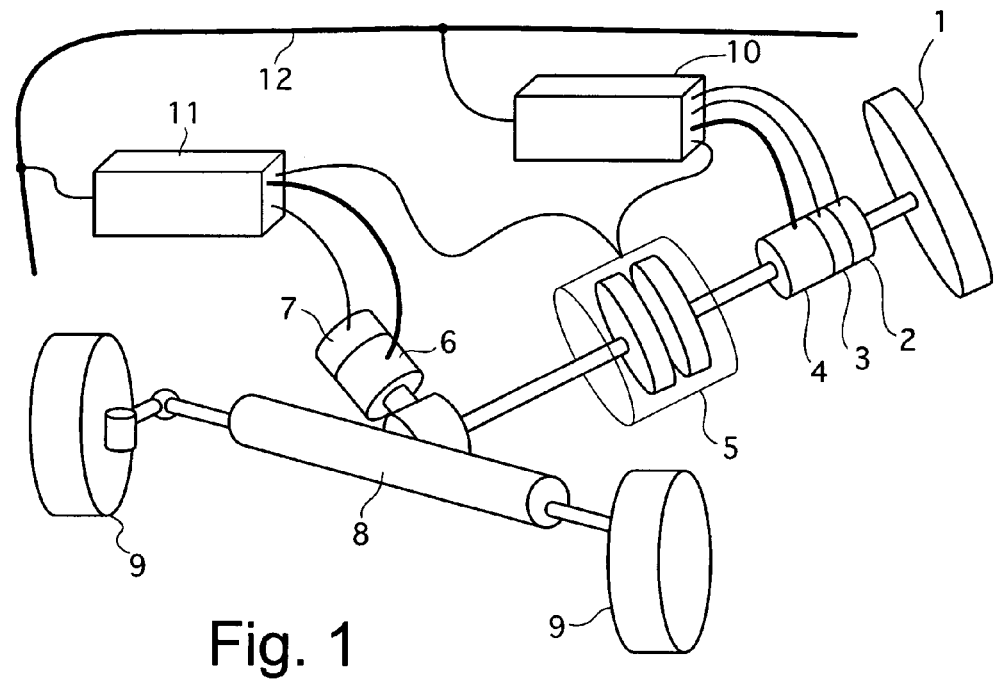
FIG. 1 is schematic view of a steer-by-wire system exemplifying a vehicle steering control apparatus in accordance with a first embodiment of the present invention.

Referring initially to FIGS. 1 to 8, a vehicle steering control apparatus is illustrated in accordance with a first embodiment of the present invention. FIG. 1 is a schematic view of a steer-by-wire (SBW) system exemplifying the vehicle steering control apparatus in accordance with the first embodiment. As shown in FIG. 1, the SBW system of the first embodiment includes a steering wheel 1 (driver operating unit), a steering wheel angle sensor 2 (steering wheel angle detector), a torque sensor 3 (operating torque detector), a reaction force motor 4 (reaction force actuator), a clutch 5, a steering motor 6 (steering actuator), a steering motor angle sensor 7 (steering motor angle detector), a steering mechanism 8 (steering unit), left and right front wheels 9 (steered wheels), a reaction force controller 10, a steering controller 11 and a communication line 12.

The controllers 10 and 11 preferably include a microcomputer with control programs that controls various process of the steer-by-wire (SBW) system as discussed below. The controllers 10 and 11 can also include other conventional sections such as an input interface circuit, an output interface circuit, and storage devices such as a ROM (Read Only Memory) device and a RAM (Random Access Memory) device. It will be apparent to those skilled in the art from this disclosure that the precise structure and algorithms for the controllers 10 and 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As explained below, with a vehicle steering control apparatus in accordance with the present invention, when the clutch 5 is in a disengaged state and a problem (e.g., failure) occurs that requires the steering wheel 1 (driver operating unit) and the steering mechanism 8 (steering unit) to be mechanically connected together, the clutch engagement command issuing section issues an engagement command to the clutch 5. After the engagement command has been issued to the clutch 5, the clutch engagement determining section determines that the clutch 5 is in an engaged state when an increase in operating torque is detected at the steering wheel 1 (driver operating unit). More specifically, after the engagement command is issued to the clutch 5, the operating torque at the driver steering wheel 1 (driver operating unit) is substantially zero during the period in which the reaction force control has been aborted but the clutch 5 has not yet actually engaged. When the clutch 5 actually engages, the torque from the road surface is transferred to the steering wheel 1 (driver operating unit) through the clutch 5 and the operating torque of the steering wheel 1 (driver operating unit) increases. Thus, it is possible to determine if the clutch 5 has engaged based on this relationship wherein the operating torque of the steering wheel 1 (driver operating unit) increases when the clutch engages. The time required for the clutch 5 to engage can vary depending on the operating state (e.g., the steering wheel operating angle or the steering wheel angular velocity) of the driver operating unit. By determining the endpoint of the clutch engagement process based on detection of torque transfer through the clutch 5, the actual engagement of the clutch 5 can be determined accurately regardless of variations in the clutch engagement time. Based on the clutch engagement determination result, the apparatus can shift smoothly to an electric power steering control mode or other steering wheel operation mode immediately after the clutch 5 actually engages. As a result, a vehicle steering control apparatus in accordance with the present invention can accurately determine when the clutch 5 has actually engaged regardless of variations in the clutch engagement time, and thus, can smoothly shift to a steering wheel operation mode immediately after the clutch 5 has actually engaged.

In the SBW system of the first embodiment, the steering wheel 1 is arranged and configured to be operated by a driver. The steering mechanism 8 is arranged to be mechanically separated from the steering wheel 1 and configured to steer the left and right front wheels 9. The reaction force motor 4 is arranged and configured to impart an operation reaction force against the steering wheel 1. The steering motor 6 is arranged and configured to impart a drive force to the steering mechanism 8. The SBW system is configured such that there is no mechanical connection between the steering wheel 1 and the steering mechanism 8 during normal use with the clutch 5 in a disengaged state. The clutch 5 of the SBW system acts as a mechanical backup mechanism that enables the steering wheel 1 and the steering mechanism 8 to be connected together mechanically. In other words, when an abnormality (e.g., a malfunction) occurs in the SBW system, the clutch 5 is connected so that the vehicle can be driven safely.

In the first embodiment, the steering wheel angle sensor 2 detects the rotary operation of the steering wheel 1, while the reaction force controller 10 calculates a command steering angle. The steering controller 11 calculates a drive command value for the steering motor 6 such that the actual steering angle is matched to the command steering angle. The vehicle is steered by driving the steering motor 6 based on the drive command value.

The steering motor 6 is a brushless motor or another type of motor. Similarly to the steering motor 6, the reaction force motor 4 is a brushless motor or the like for exerting the operation reaction force against the steering wheel. The reaction force motor 4 is driven based on a drive command value calculated by the reaction force controller 10. The drive command values calculated by the reaction force controller 10 and the steering controller 11 serve as current command values for the reaction force motor 4 and the steering motor 6.

In this SBW system, the reaction force motor 4 generates the operation reaction force of steering wheel 1 because the steering wheel 1 is not mechanically connected to the left and right wheels 9 and the steering motor 6. The operation reaction force is generated based on the axial force acting on a rack of the steering mechanism 8, the operating angle (rotational angle of the steering wheel), and the operating angular velocity (angular velocity at which the steering wheel is being turned). The torque sensor 3 is provided between the steering wheel 1 and the reaction force motor 4 and serves to enable the operating torque to be monitored. The torque sensor 3 is arranged and configured to detect the torsional strain or stress of the shaft and calculate the torque based on the torsional strain or stress. The value detected by the torque sensor 3 is not used during the SBW control but is used for control during the EPS mode (electric power steering mode) when a failure occurs in the reaction force motor 4 or the like. During the EPS mode, the clutch 5 is connected and the drive motor 6 is used in an assisting role. Thus, the value of the torque sensor 3 is monitored when a reaction force component failure or the like occurs. The reaction force component failure includes a failure occurring somewhere other than in the steering control system such as of the steering motor 6, the steering controller 11, and the steering angle sensor 7.

The current command value calculated by the steering controller 11 is calculated with an angle servo system configured to control the actual (detected) steering angle such that it tracks the command steering angle with a prescribed response characteristic.

Figure 2:
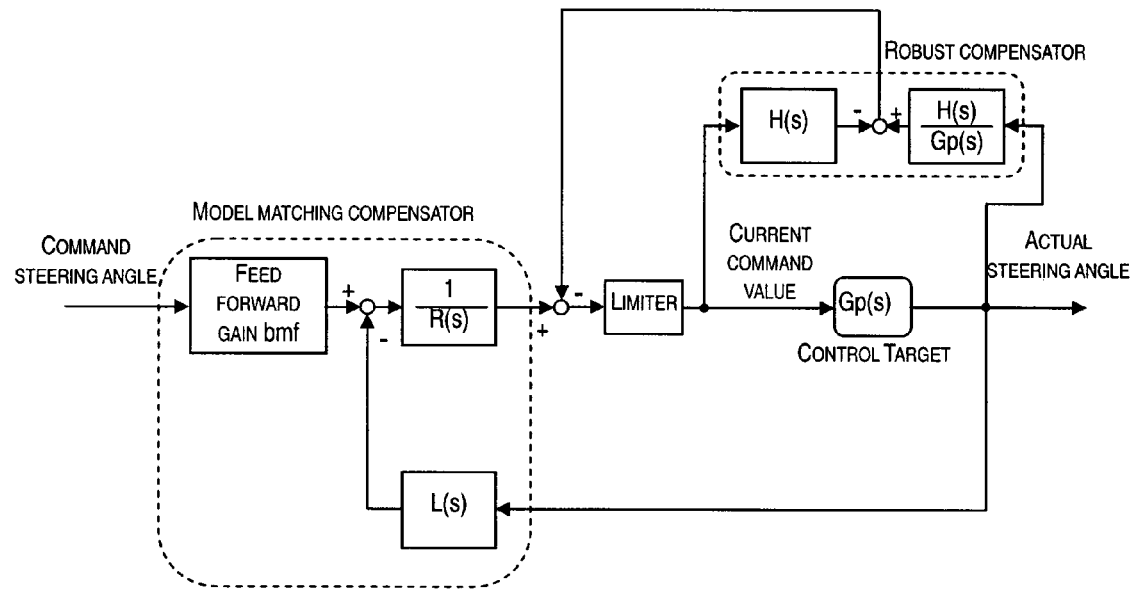
FIG. 2 is control block diagram illustrating a robust model matching method that can be used as a steering control portion of the steer-by-wire control of the first embodiment of the present invention.

The angle servo system of the steering controller 11 employs, for example a robust model matching method like that illustrated in the steering angle control block diagram of FIG. 2. The robust model matching method includes a model matching compensator for matching to a predetermined characteristic and a robust compensator. The model matching compensator calculates a current command value for achieving the command steering angle with a prescribed response characteristic and the robust compensator calculates a compensating current for taking into account disturbance components. As a result, the actual (detected) steering angle can be made to follow the command steering angle with the prescribed response characteristic even when disturbances occur, i.e., the control system can be provided with an excellent resistance to disturbances.

Figure 3:
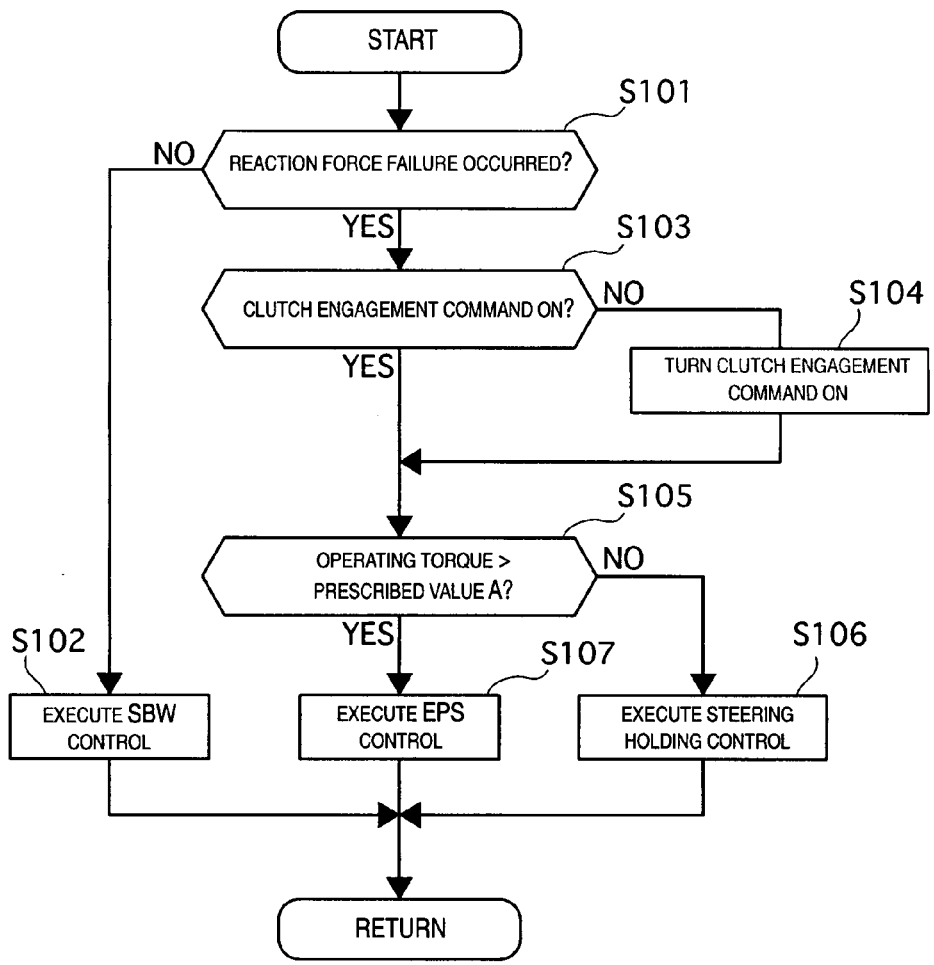
FIG. 3 is a flowchart showing the control processing executed by the reaction force controller and the steering controller of the first embodiment of the present invention in order to switch the control mode when a reaction force component failure occurs.

FIG. 3 is a flowchart showing control processing executed by the reaction force controller 10 and the steering controller 11 of the first embodiment in order to switch the control mode when a reaction force component failure (e.g., reaction force failure) occurs. Each step of the flowchart will now be explained. This processing sequence is executed by the controllers 10 and 11 once each time the SBW control cycle time elapses (e.g., every 5 msec).

In step S101 (first failure determining section), a determination is made as to whether a reaction force component failure (e.g., reaction force failure) has occurred, i.e., if an abnormality related to the reaction force control system exists, by executing a self-diagnosis of the reaction force controller 10 to see if a severed connection, short circuit, or other abnormality exists in the reaction force control system. If a failure has occurred (Yes), then control proceeds to step S103. If not (No), then control proceeds to step S102.

If a reaction force component failure (e.g., reaction force failure) is detected, the reaction force controller 10 aborts the reaction force control of the SBW control mode and communicates the occurrence of the reaction force component failure (e.g., reaction force failure) to the steering controller 11 through the communication line 12.

In step S102, a normal SBW control mode is executed (a current command value is calculated for the reaction force motor 4 and a current command value is calculated for the steering motor 6). The controller returns to the beginning of the control sequence.

In step S103, a determination is made as to whether or not a clutch engagement command is being issued to the clutch 5. If so (Yes), then control proceeds to step S105. If not (No), then control proceeds to step S104.

In step S104 (clutch engagement command issuing section), a clutch engagement command is sent to the clutch 5 and then control proceeds to step S105.

In step S105 (clutch engagement determining section), a determination is made as to whether or not the operating torque detected by the torque sensor 3 exceeds a preset prescribed value A (clutch engagement determination threshold value). If so (Yes), then control proceeds to step S107. If not (No), then control proceeds to step S106.

The prescribed value A is set to a value that will not result in an incorrect determination by taking into account the detection error of the torque sensor 3, the inertia of the steering wheel 1, and the inertia of the reaction force motor 4.

Figure 4:
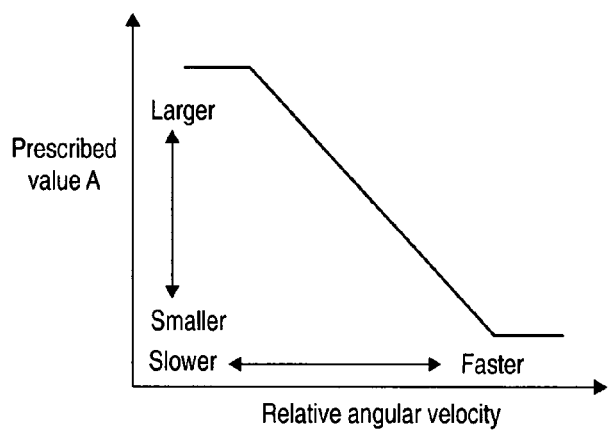
FIG. 4 is an example of a map of the relationship between the relative angular velocity and the prescribed value A used to determine if the clutch is engaged during the control mode switching processing of the first embodiment of the present invention.
Figure 5:
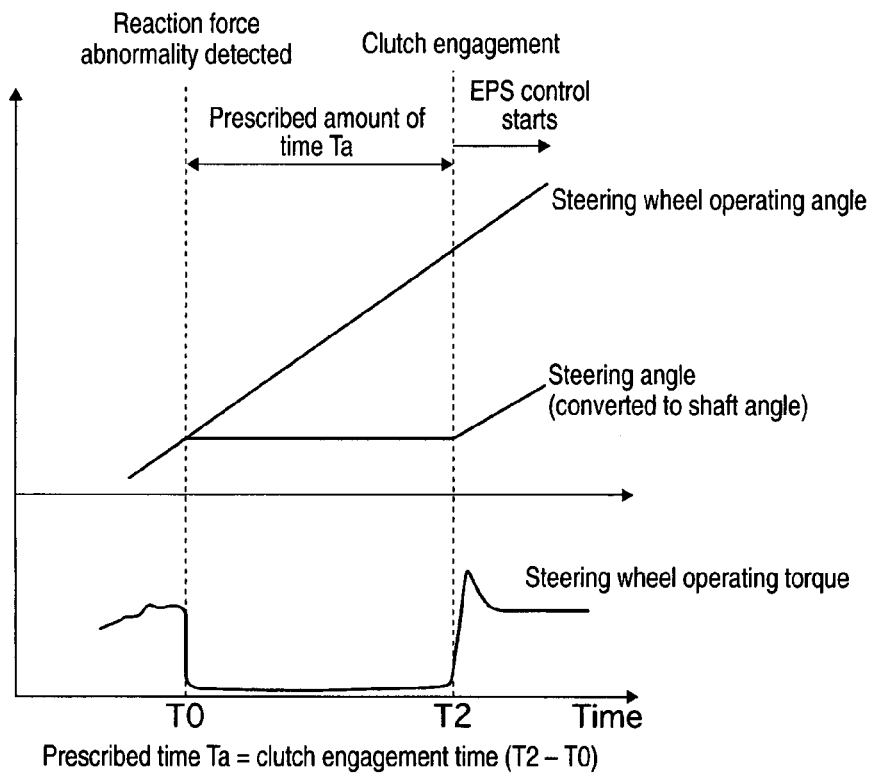
FIG. 5 is a time chart illustrating the operation of a conventional vehicle steering gear apparatus when the vehicle steering control apparatus switches from the SBW control to the EPS control due to the detection of a reaction force component failure, and when the clutch engagement time is assumed to match the preset prescribed amount of time Ta.

As shown in FIG. 4, the faster the relative angular velocity (difference between the angular velocities of the upstream and downstream sides of the clutch 5) between the steering wheel 1 (operating unit) and steering mechanism 8 (steering unit) is, the smaller the value to which the prescribed value A is set. The relative angular velocity is calculated based on a derivative of operating angle values detected by the steering wheel operating angle sensor 2 and a derivative of steering angle values detected by the steering angle sensor 7.

In step S106 (clutch engagement transitional steering control section), a steering holding control mode is executed which is contrived to calculate the command steering angle in such a manner as to hold the steered wheels 9 at the steering angle value that existed at the point in time when the engagement command was issued to the clutch 5. Then, control returns to the beginning of the control sequence.

In the steering holding control mode, the current command value for the steering motor 6 is calculated using the following equation: current command steering angle δf=previous command steering angle δf(1).

In step S107, an EPS control mode is executed in which the steering motor 6 is used as an assisting force imparting section while the clutch 5 is in an engaged state. Then, control returns to the beginning of the control sequence.

When the EPS control mode is entered, a current command value for steering assistance begins being calculated as the current command value for the steering motor 6 instead of the current command value used in the steering holding control mode.

The operational actions of the first embodiment will now be explained.

In an SBW system in accordance with the first embodiment, when an abnormality occurs in the reaction force control system (e.g., failure of the reaction force motor 4), the clutch 5 is connected and the reaction force control executed by the reaction force controller 10 is aborted. Then, the steering controller 11 calculates the current of the steering motor 6 based on the value detected by the torque sensor 3 such that the output of the steering motor 6 serves as a steering wheel operation assisting force, thereby accomplishing the function of an electric power steering device (EPS device).

However, several tens to several hundreds of milliseconds are required for the clutch 5 to actually engage after the engagement command is issued to the clutch 5. During that period, the rotary operation of the steering wheel 1 is not transmitted to the steering mechanism 8 and EPS control cannot be accomplished.

In the case of a clutch 5 having an inner race and an outer race and configured to engage by meshing rollers into a wedge-shaped space formed by the inner and outer races, a meshed state will occur and the clutch engagement will be completed if the steering wheel 1 and the steering mechanism 8 undergo relative rotation after the engagement command is issued. Consequently, the time required for the clutch 5 to actually engage after the engagement command is issued varies also depending on the operating torque of the steering wheel 1.

A comparative example will now be explained for a conventional apparatus in which the steering angle is held at the steering angle that existed when the engagement command was issued to the clutch during the period from when an abnormality of the reaction force actuator is first detected until a preset prescribed amount of time Ta elapses. As shown in the time chart of FIG. 5, if the clutch engagement time and the preset prescribed amount of time Ta (difference between EPS control start time T2 and reaction force abnormality detection time T0) are assumed to match, the operating torque is held at a low value from the reaction force abnormality detection time T0 to the EPS control start time T2 and the operating torque characteristic rises from the EPS control start time T2. As a result, the driver's ability to operate the steering wheel is not inhibited.

Figure 6:
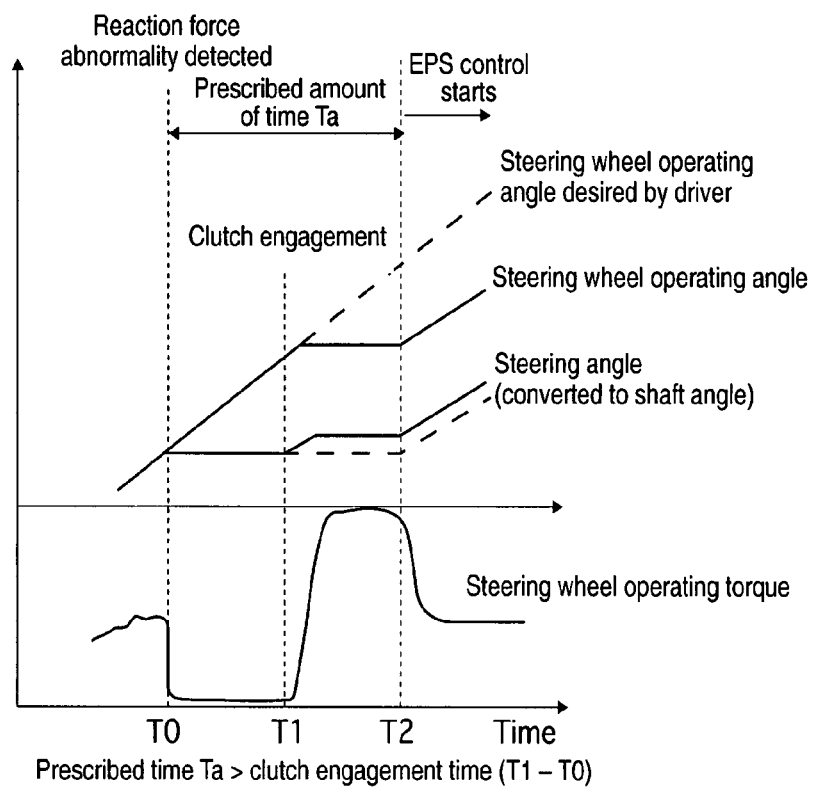
FIG. 6 is a time chart illustrating the operation of a conventional vehicle steering gear apparatus when the vehicle steering control apparatus switches from the SBW control to the EPS control due to the detection of a reaction force component failure, and when the clutch engagement time is assumed to be shorter than the preset prescribed amount of time Ta.

However, as shown in the time chart of FIG. 6, if the preset prescribed amount of time Ta (difference between EPS control start time T2 and reaction force abnormality detection time T0) is longer than the clutch engagement time (difference between clutch engagement time T1 and reaction force abnormality detection time T0), the operating torque will be held at a low value from the reaction force abnormality detection time T0 until the clutch engagement time T1. However, during the period from the clutch engagement time T1 to the EPS control start time T2, the steering angle is held constant even though the clutch 5 is engaged and a reaction force develops which holds the steering wheel fixed. Consequently, the operating torque characteristic rises acutely and the actual (detected) steering wheel operating angle departs from the operating angle desired by the driver. In short, the driver's ability to operate the steering wheel is inhibited.

Conversely, a vehicle steering control apparatus in accordance with the first embodiment can accurately determine when the clutch 5 has actually engaged regardless of variations in the clutch engagement time and, thus, can smoothly shift to a steering wheel operation mode immediately after the clutch 5 has actually engaged.

More specifically, after the engagement command is issued to the clutch 5, the operating torque of the driver operating unit is set to substantially zero during the period when the reaction force control has been aborted but the clutch 5 is not yet connected. When the clutch 5 actually engages, the torque from the road surface is transferred to the driver operating unit through the clutch 5 and the operating torque of the driver operating unit increases.

The first embodiment is contrived to utilize the fact that the operating torque of the driver operating unit rises when the clutch 5 engages. When a condition requiring the clutch 5 to be engaged occurs while the clutch 5 is in a disengaged state, the engagement command is sent to the clutch 5 and, afterwards, a torque is transmitted from the road surface to the driver operating unit through the clutch 5. The apparatus determines that the clutch 5 is in an engaged state when it detects the increase in operating torque at the driver operating unit resulting from this torque transmission.

Thus, it is possible to determine if the clutch 5 has engaged based on this relationship wherein the operating torque of the driver operating unit increases when the clutch 5 engages.

The time required for the clutch 5 to engage can vary depending on the operating torque of the driver operating unit. By determining the endpoint of the clutch engagement process based on detection of torque transfer through the clutch, the actual (detected) engagement of the clutch 5 can be determined accurately regardless of variations in the clutch engagement time.

Based on the clutch engagement determination result, the apparatus can shift smoothly to an EPS control mode or other steering wheel operation mode immediately after the clutch 5 actually engages.

As a result, a vehicle steering control apparatus in accordance with the present invention can accurately determine when the clutch 5 has actually engaged regardless of variations in the clutch engagement time and, thus, can smoothly shift to a steering wheel operation mode immediately after the clutch 5 has actually engaged.

The operational actions realized with the control mode switching control when a reaction force component failure (e.g., reaction force failure) occurs and the operation of switching from SBW control to EPS control when a reaction force component failure (e.g., reaction force failure) occurs will now be explained for a vehicle steering control apparatus in accordance with the first embodiment.

When the reaction force control system is normal, the control processing flows from step S101 to step S102 of the flowchart shown in FIG. 3. In step S102, the reaction force control and steering control are executed in accordance with the normal SBW control mode with the clutch 5 disengaged.

In the first control cycle after a failure occurs in the reaction force control system, control flows from step S101 to step S1103 and then to step S104 of the flowchart shown in FIG. 3. The reaction force control of the SBW control mode is aborted and in step S104 the clutch engagement command is issued to the clutch 5.

Immediately after the clutch engagement command starts being sent, the control processing flows from step S104 to step S105 and then to step S106 of the flowchart shown in FIG. 3 because the operating torque does not exceed the prescribed value A. In step S106, the apparatus switches from executing steering control in SBW control mode to a steering holding control mode in which the steering angle is held at the steering angle that existed when the clutch engagement command was issued.

So long as the clutch engagement determination condition of step S105 remains unsatisfied, the control processing repeats steps S101, S103, S105, and S106 (in order as listed) of the flowchart shown in FIG. 3, thus continuing the steering holding control.

Afterwards, the clutch 5 enters an engaged state and the operating torque increases. When the operating torque exceeds the prescribed value A, the control processing repeats steps S101, S103, S105, and S107 (in order as listed) of the flowchart shown in FIG. 3. In step S107, the apparatus switches from the steering holding control mode to an EPS control mode in which the steering motor 6 is used as an assisting force imparting section.

Figure 7:
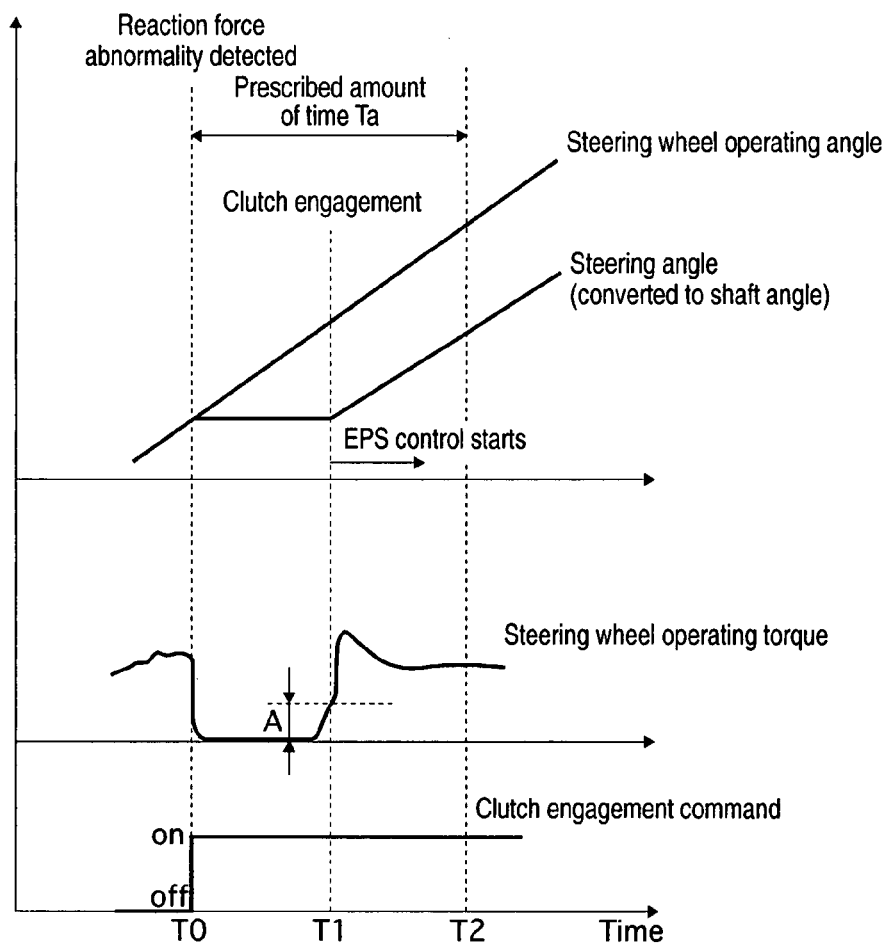
FIG. 7 is a time chart illustrating the operation of the first embodiment of the present invention when the vehicle steering control apparatus switches from the SBW control to the EPS control due to the detection of a reaction force component failure.

The operation of switching from the SBW control to the EPS control when a reaction force component failure (e.g., reaction force failure) occurs will now be explained based on the time chart shown in FIG. 7. FIG. 7 illustrates the operation of the first embodiment in a situation where the driver is turning the steering wheel 1 and the clutch 5 engages in an amount of time shorter than the prescribed time Ta while the steering wheel operating angle is increasing.

At the time T0, a reaction force abnormality is detected and the clutch engagement command is turned on. The command steering angle is also issued so as to hold the steering angle constant. When the clutch 5 engages, a force is transmitted from the road surface to the steering wheel 1 through the clutch 5 and the operating torque increases, as described previously. During the period from the time T0 when the reaction force abnormality is detected to the time T1 when the clutch connects, the operating torque is substantially zero because the reaction force control has been aborted. As the clutch 5 engages, the operating torque starts to rise. When the operating torque exceeds the prescribed value A at the time T1, the apparatus determines that the clutch is engaged and switches from steering holding control mode to EPS control mode. The command steering angle is then changed from the held value to a value calculated based on the EPS control. As a result, after the clutch engagement time T1, the driver's operation of the steering wheel 1 is reflected in the steering angle and the operation reaction force is generated normally, enabling normal smooth steering wheel operation.

As a result of this operational configuration, the engagement of the clutch 5 can be determined based on the operating torque at the driver operating unit (steering wheel 1) without being affected by variations of the clutch engagement time. Thus, the problem of the previously described conventional technology, i.e., the problem of the driver's ability to operate the steering wheel being inhibited, can be resolved.

During the period from the time T0 to the time T1 when a reaction force torque is not generated, it is possible for the steering wheel operating amount to change greatly in opposition to the intent of the driver. However, even if such a change occurs, the vehicle behavior can be prevented from becoming unstable because the steering angle is held constant during the period from the time T0 to the time T1.

As described previously, in a vehicle steering control apparatus in accordance with the first embodiment, a torque sensor 3 is provided to detect the operating torque at the driver operating unit and the clutch engagement determining section (step S105) determines that the clutch 5 has entered an engaged state when, after the engagement command has been issued to the clutch 5, the operating torque detected by the torque sensor 3 exceeds a prescribed value A. If, for example, the clutch were determined to be engaged when the operating torque increased only slightly, then the clutch might be incorrectly determined to be engaged when the operating torque increased due to operation of the steering wheel by the driver. Conversely, if the clutch were determined to be engaged after the operating torque increased greatly, the determination timing would be late and the steering wheel reaction force would undergo a temporary increase after the engagement determination, causing the steering to feel unnatural to the driver. With the first embodiment, however, the prescribed value A serves as a threshold value for determining if the clutch 5 is engaged, i.e., the clutch 5 is determined to be engaged when the operating torque exceeds the prescribed value A. As a result, incorrect engagement determinations and late engagement determinations can both be prevented.

In a vehicle steering control apparatus in accordance with the first embodiment, the clutch engagement determining section (step S105) sets the prescribed value A (clutch engagement determination threshold value) such that the faster the relative angular velocity is between the driver operating unit and the steering unit, the smaller the prescribed value A becomes.

In the case of a clutch 5 that employs a meshing structure to engage, a meshed state will occur and the clutch engagement will be completed if the steering wheel 1 and the steering mechanism 8 undergo relative rotation after the engagement command is issued. The time required for the clutch to actually engage after the engagement command is issued varies depending on the relation rotational speed between the upstream and downstream sides of the clutch.

Since the first embodiment is configured such that the faster the relative angular velocity between operating unit and steering unit is, the smaller the value to which the prescribed value A is set, the timing at which engagement of the clutch 5 is completed can be determined accurately regardless of whether the relative angular velocity across the clutch 5 is fast or slow when a clutch employing a meshing structure is used.

A vehicle steering control apparatus in accordance with the first embodiment is provided with a reaction force motor 4 configured to impart an operation reaction force to the driver operating unit and a steering motor 6 configured to impart a steering force to the steering unit. When the clutch engagement determining section (step S105) determines that the clutch 5 is engaged, the apparatus switches from the SBW control mode involving reaction force control and steering control that was being executed before the engagement command was issued to the clutch 5 to an EPS control mode (step S107) in which at least one of the reaction force motor 4 and the steering motor 6 is used as an assisting force imparting section.

If, for example, the apparatus were configured to simply switch from the SBW control mode to a direct steering mode in which the steering wheel is connected directly to the steering mechanism when the clutch becomes engaged, the steering load born by the driver would be excessively large in cases where a large steering wheel operation reaction force was transmitted from the road surface, such as when the steering wheel is turned in one direction and held.

With the first embodiment, since the apparatus switches to an EPS control mode when it determines that the clutch 5 is engaged, the steering load born by the driver is low immediately after the clutch 5 actually engages. More specifically, the steering load is low because the EPS control mode assists the driver with respect to operating the steering wheel 1.

A vehicle steering control apparatus in accordance with the first embodiment is provided with a first failure determining section (step S101) configured to determine if a reaction force component failure (e.g., reaction force failure) has occurred and a clutch engagement command issuing section (step S104) configured to issue an engagement command to the clutch based on a determination that a failure has occurred somewhere related to the reaction force. The apparatus is further provided with a clutch engagement transitional steering control section (step S106) configured to switch from steering control in the SBW control mode to a vehicle behavior suppressing steering control during the period from when the clutch engagement command issuing section issues the engagement command until the clutch engagement determining section (step S105) determines that the clutch 5 is in an engaged state.

If, for example, the apparatus were configured such that the SBW control was continued until the clutch engaged after a reaction force component failure (e.g., reaction force failure) occurred, it would be more likely for the steering wheel operating amount or angle to change greatly in opposition to the intent of the driver because a reaction torque would not be generated. In such a case, the vehicle behavior would become unstable because the SBW control would change the steering angle in accordance with the steering wheel operating amount.

Meanwhile, with the first embodiment, the steering control of the SBW control mode is switched to a vehicle behavior suppressing steering control during the period from when the engagement command is issued until the clutch 5 is determined to be engaged. As a result, even if the steering wheel operating amount changes greatly in opposition to the intent of the driver due to the absence of a reaction torque, it is possible to suppress the tendency of the vehicle behavior to become unstable.

In a vehicle steering control apparatus in accordance with the first embodiment, the clutch engagement transitional steering control section (step S106) is configured to switch to a steering holding control contrived to maintain the steering angle that existed at the point in time when the clutch engagement command issuing section (step S104) issued the engagement command to the clutch 5.

Thus, stable vehicle behavior can be maintained by holding the steering angle constant during the period from when the engagement command is issued to the clutch 5 until the clutch 5 is determined to be engaged.

The effects of the first embodiment will now be explained.

A vehicle steering control apparatus in accordance with the first embodiment achieves the effects listed below.

(1) A vehicle steering control apparatus in accordance with the first embodiment includes a steering wheel 1 arranged and configured to be operated by a driver, a steering mechanism 8 arranged to be mechanically separated from the steering wheel 1 and configured to steer the left and right front wheels 9 in accordance with the operating torque of the steering wheel 1, a clutch 5 arranged and configured to mechanically connect the steering wheel 1 to the steering mechanism 8, a clutch engagement command issuing section (step S104) configured to issue an engagement command to the clutch 5 when the clutch 5 is disengaged and a clutch engaging condition is satisfied, and a clutch engagement determining section (step S105) configured to determine that the clutch 5 is in an engaged state when an increase in torque is detected at the steering wheel 1 after the engagement command has been issued to the clutch 5. As a result, a vehicle steering control apparatus in accordance with the first embodiment can accurately determine when the clutch 5 has actually engaged regardless of variations in the clutch engagement time and, thus, can smoothly shift to a steering wheel operation mode immediately after the clutch 5 has actually engaged.

(2) In the first embodiment, the apparatus is provided with a torque sensor 3 configured and arranged to detect the operating torque at the driver operating unit and the clutch engagement determining section (step S1105) is configured to determine that the clutch 5 is in an engaged state when, after the engagement command has been issued to the clutch 5, the operating torque detected by the torque sensor 3 exceeds a prescribed value A. As a result, incorrect clutch engagement determinations and late clutch engagement determinations can both be prevented.

(3) In the first embodiment, the clutch engagement determining section (step S105) is configured such that the faster the relative angular velocity between operating unit and steering unit is, the smaller the value to which the prescribed value A is set (see FIG. 4). As a result, the timing at which engagement of the clutch 5 is completed can be determined accurately regardless of whether the relative angular velocity across the clutch 5 is fast or slow when a clutch employing a meshing structure is used as the clutch 5.

(4) A vehicle steering control apparatus in accordance with the first embodiment is provided with a reaction force motor 4 configured to impart an operation reaction force to the driver operating unit and a steering motor 6 configured to impart a steering force to the steering unit. When the clutch engagement determining section (step S105) determines that the clutch 5 is engaged, the apparatus switches from the SBW control mode involving reaction force control and steering control that was being executed before the engagement command was issued to the clutch 5 to an EPS control mode (step S107) in which at least one of the reaction force motor 4 and the steering motor 6 is used as an assisting force imparting section. As a result, the apparatus can shift to a steering wheel operation mode having a low steering load, i.e., EPS control mode, immediately after the clutch 5 actually engages.

(5) A vehicle steering control apparatus in accordance with the first embodiment is provided with a first failure determining section (step S101) configured to determine if a reaction force component failure (e.g., reaction force failure), and the clutch engagement command issuing section (step S1104) is configured to issue an engagement command to the clutch 5 based on a determination that a reaction force component failure (e.g., reaction force failure) has occurred. The apparatus is further provided with a clutch engagement transitional steering control section (step S1106) configured to switch from steering control in the SBW control mode to a vehicle behavior suppressing steering control during the period from when the clutch engagement command issuing section (step S1104) issues the engagement command until the clutch engagement determining section (step S105) determines that the clutch 5 is in an engaged state. As a result, even if the steering wheel operating amount changes greatly in opposition to the intent of the driver due to the absence of a reaction torque, it is possible to suppress the tendency of the vehicle behavior to become unstable.

(6) The clutch engagement transitional steering control section (step S1106) is configured to switch to a steering holding control contrived to maintain the steering angle that existed at the point in time when the clutch engagement command issuing section (step S104) issued the engagement command to the clutch 5. As a result, stable vehicle behavior can be maintained by holding the steering angle constant during the period from when the engagement command is issued to the clutch 5 until the clutch is determined to be engaged.

Figure 8:
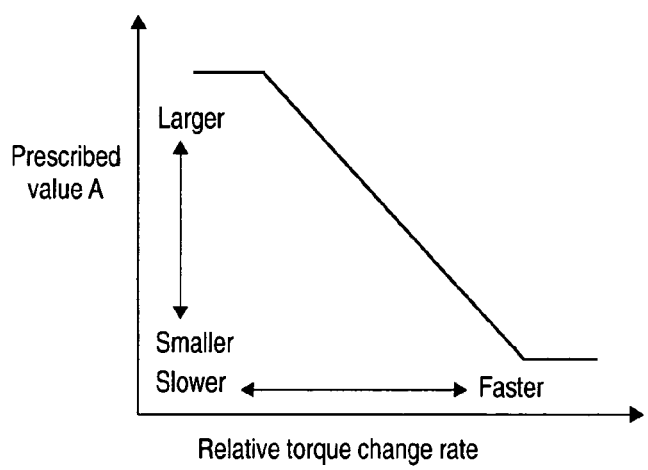
FIG. 8 is an example of a map of the relationship between the relative torque change rate and the prescribed value A used to determine if the clutch is engaged during the control mode switching processing of the first embodiment of the present invention.

The same effect can be obtained by setting the prescribed value A such that the faster the relative torque change rate between the steering wheel 1 (operating unit) and steering mechanism 8 (steering unit) (i.e., the difference between the torque change rates of the upstream and downstream sides of the clutch 5) is, the smaller the value to which the prescribed value A is set, as shown in FIG. 8. It is also acceptable to, for example, calculate threshold values using both methods and use a select-low approach to set a final prescribed value when the prescribed value determined based on the relative angular velocity and the prescribed value determined based on the relative torque change rate are different.

Second Embodiment

A second embodiment will now be described in which the steering holding control of the first embodiment is replaced with a slow steering control as the clutch engagement transitional steering control.

Otherwise, the constituent features of the second embodiment are the same as those of the first embodiment shown in FIGS. 1 to 2 and explanations and drawings thereof are omitted for the sake of brevity.

Figure 9A:
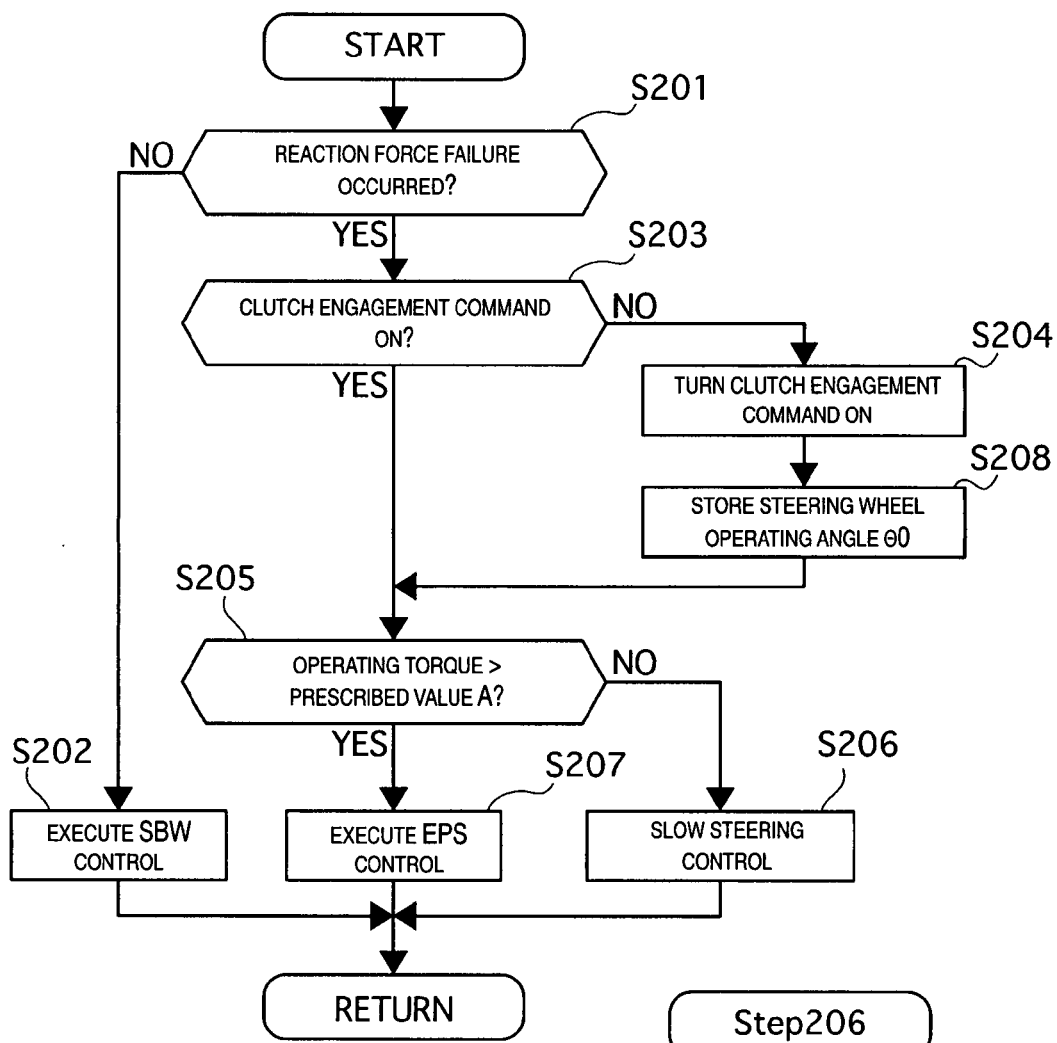
FIG. 9(a) is a flowchart showing the control processing executed by the reaction force controller and the steering controller of a second embodiment of the present invention in order to switch the control mode when a reaction force component failure occurs.

FIG. 9(a) is a flowchart showing control processing executed by the reaction force controller 10 and the steering controller 11 of the second embodiment in order to switch the control mode when a reaction force component failure (e.g., reaction force failure) occurs. Each step of the flowchart will now be explained. This processing sequence is executed by the controllers 10 and 11 once each time the SBW control cycle time elapses (e.g., every 5 msec). Steps S201 to S205 and step S207 are the same as steps S101 to S105 and S107, respectively, of the flowchart shown in FIG. 3 and explanations there of are omitted for the sake of brevity.

In step S208, the steering wheel operating angle θ0 existing at the point in time when the clutch engagement command was first issued is stored in memory and, then, control proceeds to step S205.

The steering wheel operating angle θ0 is a value detected by the steering wheel angle sensor 2. The stored steering wheel operating angle θ0 is used in step S206 to compute the command steering angle for a slow steering control.

In step S206 (clutch engagement transitional steering control section), a slow steering control mode is executed which is contrived to compute the command steering angle such that the steering gear ratio is set to a slow gear ratio. Then, control returns to the beginning of the control sequence.

Figure 9B:
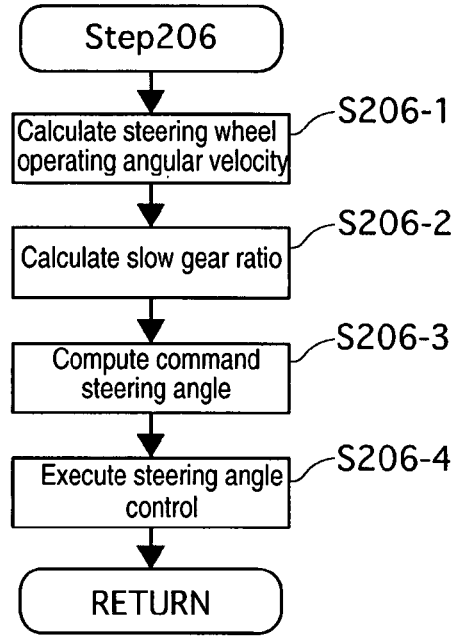
FIG. 9(b) is a flowchart showing the computational processing executed in order to calculate the command steering angle to be sent to the steering motor during the slow steering control mode executed in step S206 of FIG. 9(a)

FIG. 9(b) is a flowchart showing the processing executed in order to compute the command steering angle for the steering motor 6 during the slow steering control mode executed in step S206 of FIG. 9(a). The steps of FIG. 9(b) will now be explained.

In step S206-1, the operating angular velocity of the steering wheel is calculated and control proceeds to step S206-2.

The operating angular velocity is calculated by, for example, finding a derivative the output from the steering wheel angle sensor 2 with respect to time.

Figure 10:
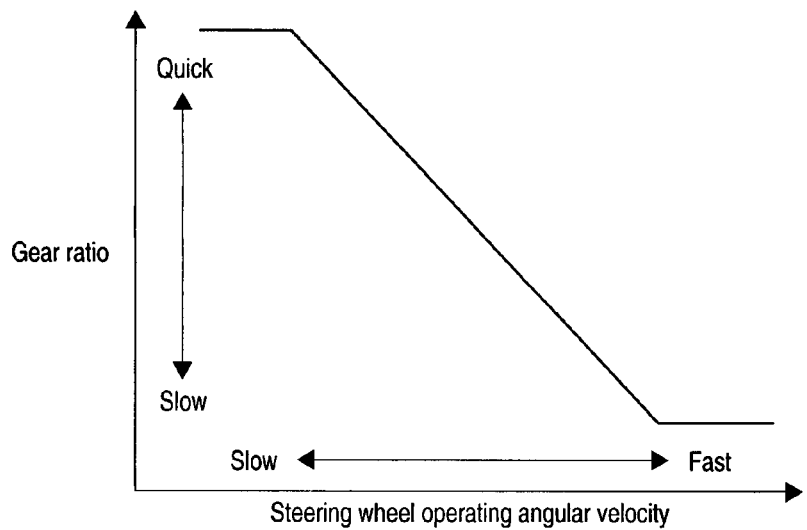
FIG. 10 is an example of a map of the relationship between the steering wheel operating angular velocity and the gear ratio used to set the gear ratio during the slow steering control of the second embodiment of the present invention.

In step S206-2, the steering gear ratio to be set is calculated using the operating angular velocity gear ratio map shown in FIG. 10 based on the operating angular velocity calculated in step S206-1. Then, control proceeds to step S206-3.

The characteristic curve of the operating angular velocity gear ratio map shown in FIG. 10 is contrived such that the steering gear ratio decreases as the operating angular velocity increases. A "slow gear ratio" means that the rate of change of the steering angle with respect to a given rate of change in the steering wheel operating angle is small, i.e., a gear ratio that keeps the steering angle of the left and right front wheels 9 small with respect to a given amount of angular rotation of the steering wheel 1.

In step S206-3, the command steering angle to be used during the period from when the clutch engagement command is turned on until clutch engagement is determined to have occurred is calculated. Then, control proceeds to step S206-4.

The equations used to calculate the command steering angle in step S206-3 are as follows: command steering angle change amount dδf=steering gear ratio N×(operating angle θ−operating angle θ0 at engagement command issuance) and current command steering angle δf=previous command steering angle δf(1)+command steering angle change amount dδf.

In step S206-4, a current command value is calculated and the steering motor 6 is controlled so as to achieve the command steering angle δf computed in step S206-3 of the current control cycle.

The operational actions of the second embodiment will now be explained.

The operational actions realized with the control mode switching control when a reaction force component failure (e.g., reaction force failure) occurs and the operation of switching from SBW control to EPS control when a reaction force component failure (e.g., reaction force failure) occurs will now be explained for a vehicle steering control apparatus in accordance with the second embodiment.

When the reaction force control system is normal, the control processing flows from step S201 to step S202 of the flowchart shown in FIG. 9(a). In step S202, the reaction force control and steering control are executed in accordance with the normal SBW control mode with the clutch 5 disengaged.

In the first control cycle after a failure occurs in the reaction force control system, control flows from step S201 to step S203 and then to step S204 of the flowchart shown in FIG. 9(a). The reaction force control of the SBW control mode is aborted and, in step S204, the clutch engagement command is issued to the clutch 5. Then, in step S208, the steering wheel operating angle θ0 existing at the time when the clutch engagement command was first turned on is stored.

Immediately after the clutch engagement command starts being sent, the control processing flows from step S208 to step S205 and then to step S206 of the flowchart shown in FIG. 9(a) because the operating torque does not exceed the prescribed value A. In step S206, the apparatus switches from executing steering control in SBW control mode to a slow steering control mode in which the steering gear ratio is set to a slow gear ratio. In the slow steering control, the steering motor 6 is controlled based on the slow gear ratio, which is set in accordance with the flowchart shown in FIG. 9(*b*).

Figure 11:
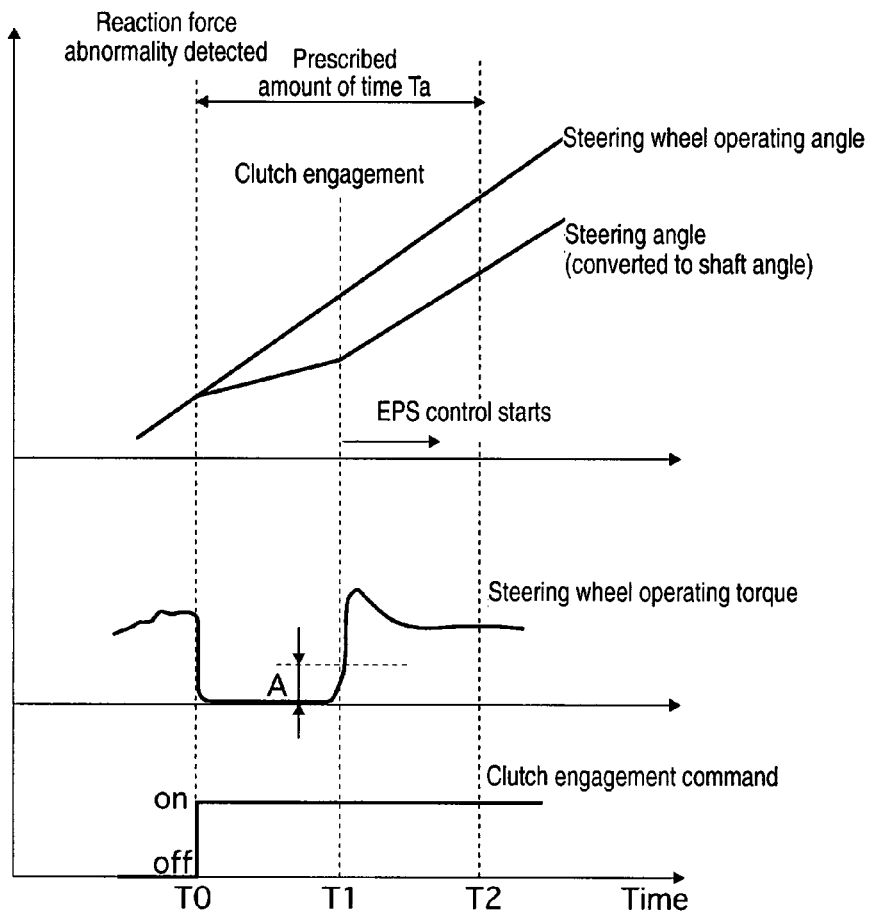
FIG. 11 is a time chart illustrating the operation of the second embodiment of the present invention when the vehicle steering control apparatus switches from the SBW control to the EPS control due to the detection of a reaction force component failure.

So long as the clutch engagement determining condition of step S205 remains unsatisfied, the control processing repeats steps S201, S203, S205, and S206 (in order as listed) of the flowchart shown in FIG. 9(*a*), thus continuing the slow steering control. Afterwards, the clutch 5 enters an engaged state and the operating torque increases. When the operating torque exceeds the prescribed value A, the control processing repeats steps S201, S203, S205, and S207 (in order as listed) of the flowchart shown in FIG. 9(*a*). In step S207, the apparatus switches from the slow steering control mode to an EPS control mode in which the steering motor 6 is used as an assisting force imparting section The operation of switching from the SBW control to the EPS control when a reaction force component failure (e.g., reaction force failure) occurs will now be explained based on the time chart shown in FIG. 11. FIG. 11 illustrates the operation of the second embodiment in a situation where the driver is turning the steering wheel 1 and the clutch 5 engages in an amount of time shorter than the prescribed time Ta while the steering wheel operating angle is increasing.

At the time T0, a reaction force abnormality is detected and the clutch engagement command is turned on. The steering gear ratio (i.e., operating angle: steering angle) is changed from a ratio of 1:1 to a slower gear ratio and the command steering angle is calculated such that the steering angle changes more gradually. When the clutch 5 engages, a force is transmitted from the road surface to the steering wheel 1 through the clutch 5 and the operating torque increases, as described previously. During the period from the time T0 when the reaction force abnormality is detected to the time T1 when the clutch connects, the operating torque is substantially zero because the reaction force control has been aborted. As the clutch 5 engages, the operating torque starts to rise. When the operating torque exceeds the prescribed value A at the time T1, the apparatus determines that the clutch is engaged and switches from the slow steering control mode to the EPS control mode. The command steering angle is then changed from the value calculated based on the slow steering control to a value calculated based on the EPS control. As a result, after the clutch engagement time T1, the driver's operation of the steering wheel 1 is reflected in the steering angle and the operation reaction force is generated normally, enabling normal smooth steering wheel operation.

As a result of this operational configuration, the engagement of the clutch 5 can be determined based on the operating torque at the driver operating unit (steering wheel 1) without being affected by variations of the clutch engagement time. Thus, the problem of the previously described conventional technology, i.e., the problem of the driver's ability to operate the steering wheel being inhibited, can be resolved.

During the period from the time T0 to the time T1, vehicle control that reflects the intent of the driver can be accomplished because the steering angle is controlled with a slow steering gear ratio while the clutch 5 is in the process of engaging.

Furthermore, by adjusting the steering gear ratio to a slower value when the steering wheel operating speed is higher, the vehicle behavior can be held stable even if the steering wheel operating amount changes greatly in opposition to the intent of the driver due to the insufficient reaction torque.

The effects of the first embodiment will now be explained.

In addition to the effects (1) to (5) obtained with the first embodiment, a vehicle steering control apparatus in accordance with the second embodiment achieves the effects listed below.

(7) In the second embodiment, the clutch engagement transitional steering control section (step S206) is configured to switch to a slow steering control contrived to set the steering gear ratio to a slow gear ratio when the clutch engagement command issuing section (step S204) issues the engagement command to the clutch 5. As a result, changes in the vehicle behavior can be suppressed and vehicle control that reflects the intent of the driver can be achieved during the period from when the engagement command is issued to the clutch 5 until the clutch 5 is determined to be engaged.

(8) Since the clutch engagement transitional steering control section (step S206) is configured to set the steering gear ratio to a slower gear ratio in accordance with increasing steering wheel operating angular velocity (FIG. 10), the tendency for the behavior of the vehicle to become unstable can be suppressed even if the steering wheel operating amount changes greatly in opposition to the intent of the driver due to the insufficient reaction torque.

In the second embodiment described above, a slow steering control is executed during the clutch engagement operation in order to obtain a slow steering gear ratio in accordance with the steering wheel operating angular velocity. However, it is also possible to resolve the problems of the conventional technology and obtain a vehicle control that reflects the intent of the driver by establishing a fixed mechanical gear ratio during the clutch engagement operation. Since the processing of the flowchart shown in FIG. 9 would remain the same, an explanation of the processing steps executed in such a case is omitted.

Third Embodiment

A third embodiment will now be described in which the apparatus is configured to switch from a SBW control to an EPS control with the clutch connected when the voltage of a power source declines.

Otherwise, the constituent features of the third embodiment are the same as those of the first embodiment shown in FIGS. 1 to 2 and explanations and drawings thereof are omitted for the sake of brevity.

Figure 12:
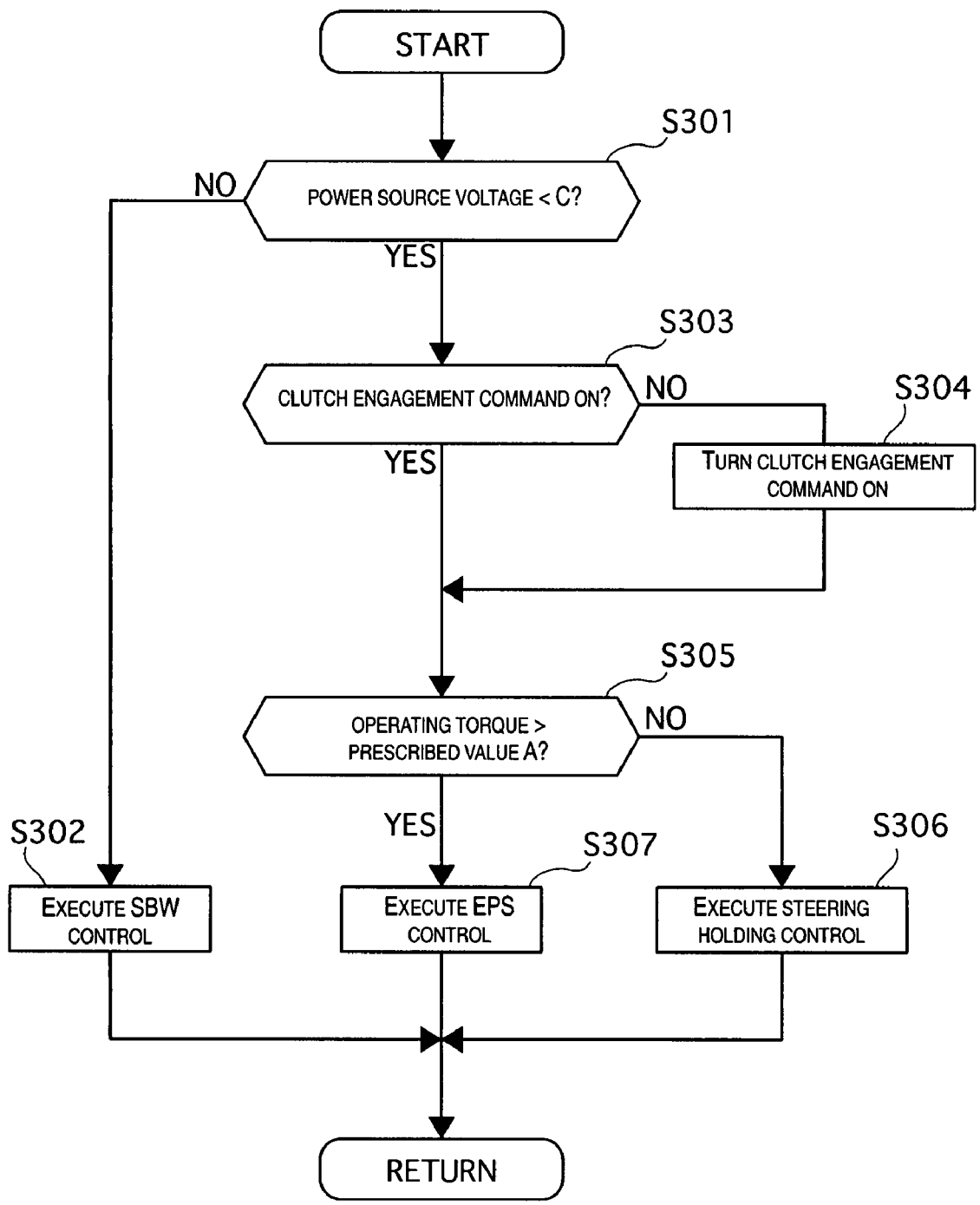
FIG. 12 is a flowchart showing the control processing executed by the steering controller of the third embodiment of the present invention in order to switch the control mode when a power source voltage decline occurs.

FIG. 12 is a flowchart showing control processing executed by the reaction force controller 10 and the steering controller 11 of the third embodiment in order to switch the control mode when a the voltage of the power source declines. Each step of the flowchart will now be explained. This processing sequence is executed by the controllers 10 and 11 once each time the SBW control cycle time elapses (e.g., every 5 msec). The processing of steps S302 to S307 is the same as in steps S102 to S107, respectively, of the flowchart 3 and explanations there of are omitted for the sake of brevity.

In step S301 (second failure determining section), a determination is made as to whether or not the power source voltage is less than a prescribed value C. If so (Yes), then control proceeds to step S303. If not (No), then control proceeds to step S302. The prescribed value C is, for example, 9 volts.

In step S304, the clutch engagement operation is started by issuing the clutch engagement command to the clutch 5. Information indicating that the clutch engagement command is on is transmitted to the reaction force controller 10 via the communication line 12.

Figure 13:
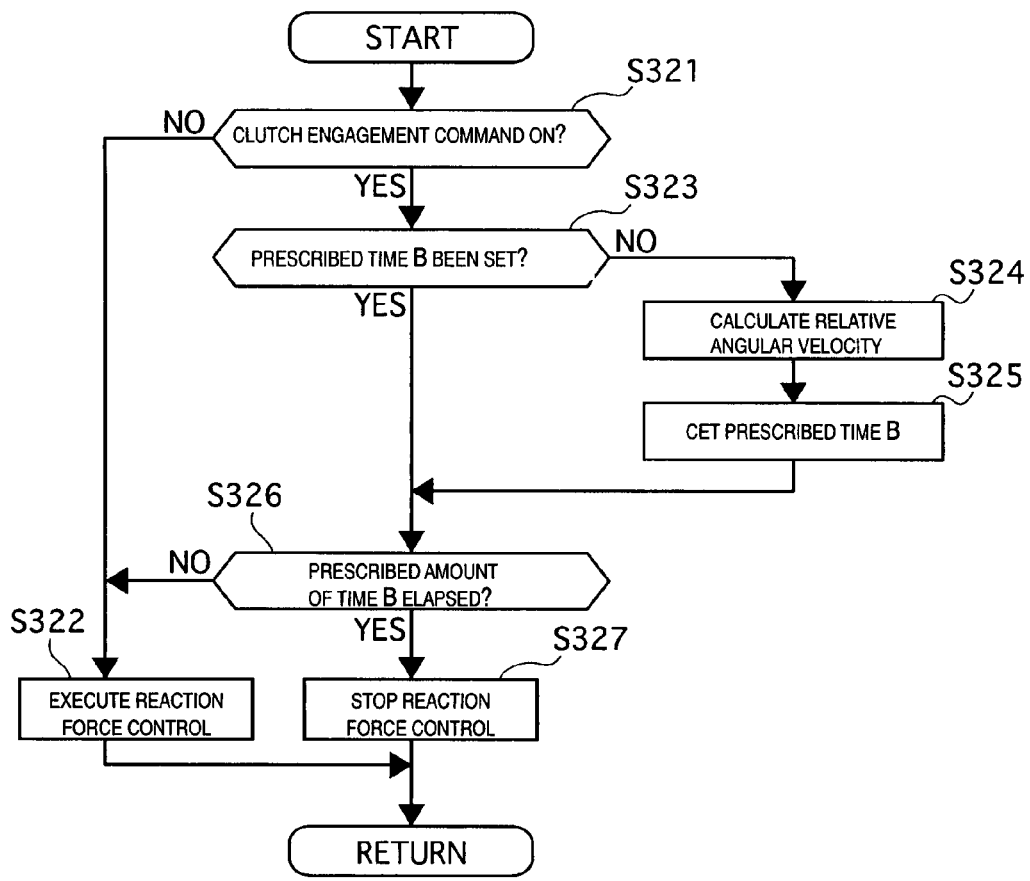
FIG. 13 is a flowchart showing the control processing executed by the reaction force controller of the third embodiment of the present invention in order to stop the reaction force control.

FIG. 13 is a flowchart showing the reaction force control stopping processing executed by the reaction force controller 10 of the third embodiment. Each step of the flowchart will now be explained (this processing constitutes the reaction force control stopping section).

In step S321, a determination is made as to whether or not the steering controller 11 has issued the clutch engagement command. If so (Yes), then control proceeds to step S323. If not (No), then control proceeds to step S322.

In step S322, the reaction force control of the SBW control mode is executed without interruption. Then, control returns to the beginning of the control sequence.

In step S323, a determination is made as to whether or not a prescribed amount of time B has been set. If so (Yes), then control proceeds to step S326. If not (No), then control proceeds to step S324.

In step S324, the relative angular velocity between the driver operating unit and the steering unit is calculated and control proceeds to step S325. The relative angular velocity between the driver operating unit and the steering unit is calculated by, for example, finding the difference between a time derivative of the output of the steering wheel angle sensor 2 and a time derivative of the output of the steering angle sensor 7. In such a case, before the difference is calculated, the outputs of the angle sensors 2 and 7 are each converted into an angle about a single axis (e.g., the axis of the steering shaft) based on the gear ratios.

Figure 14:
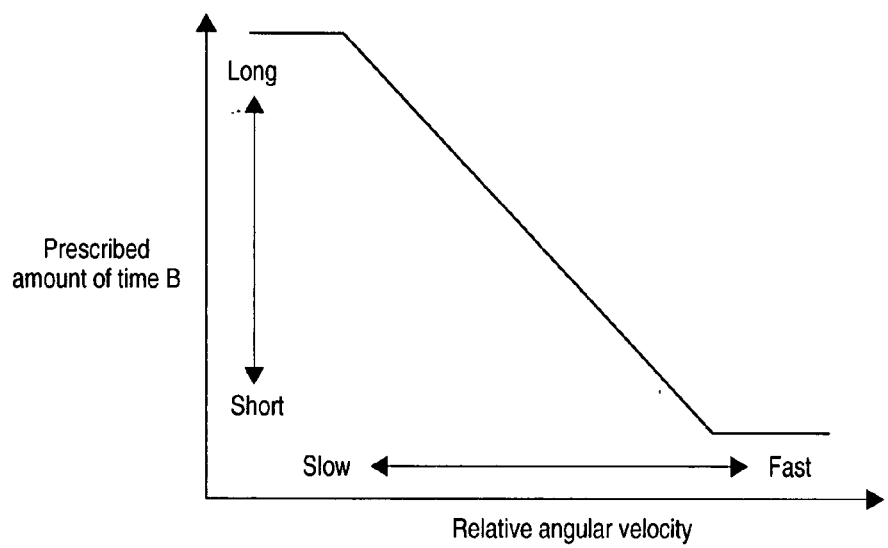
FIG. 14 is an example of a map of the relationship between the relative angular velocity and the prescribed amount of time B used in order to set the prescribed amount of time B during the reaction force stop processing of the third embodiment of the present invention.

In step S325, the prescribed amount of time B is set using the map shown in FIG. 14 based on the relative angular velocity calculated in step S324. Then, control proceeds to step S326. As shown in FIG. 14, the map plots the prescribed amount of time versus the relative angular velocity.

The prescribed amount of time B is set to be shorter than the amount of time required for the clutch to engage after the clutch engagement command is issued, which is determined based on measurement data or the like. As shown, for example, in the map of FIG. 14, the prescribed amount of time B is set such that the faster the relative angular velocity is, the shorter the prescribed amount of time B becomes.

In step S326, a determination is made as to whether or not the amount of time counted since the clutch engagement command was issued has reached the prescribed amount of time B calculated in step S325. If so (Yes), then control proceeds to step S327. If not (No), then control proceeds to step S322.

In step S327, the reaction force control of the SBW control mode is stopped. Then, control returns to the beginning of the control sequence. In other words, the reaction force control of the SBW control mode is continued until it is determined in step S326 that the prescribed amount of time B has elapsed since the clutch engagement command was issued. Then, when it is determined in step S326 that the prescribed amount of time B has elapsed, the reaction force control of the SBW control mode is stopped. As a result, the steering wheel operating torque goes to substantially zero.

The operational actions of the third embodiment will now be explained.

The operational actions realized with the control mode switching control executed when a power source voltage decline occurs, the stopping of the reaction force control of the SBW control mode, and the operation of switching from SBW control to EPS control when a power source voltage decline occurs will now be explained for a vehicle steering control apparatus in accordance with the third embodiment.

When the power source voltage is at a normal level, the control processing flows from step S301 to step S302 of the flowchart shown in FIG. 12. In step S302, the reaction force control and steering control are executed in accordance with the normal SBW control mode with the clutch 5 disengaged.

In the first control cycle executed after the power source voltage has fallen below the prescribed value C, the control processing flows from step S301 to step S303 and then to step S304 of the flowchart shown in FIG. 12. In step S304, the clutch engagement command is issued to the clutch 5.

Immediately after the clutch engagement command starts being sent, the control processing flows from step S304 to step S305 and then to step S306 of the flowchart shown in FIG. 12 because the operating torque does not exceed the prescribed value A. In step S306, the apparatus switches from executing steering control in SBW control mode to a steering holding control mode in which the steering angle is held at the steering angle that existed when the clutch engagement command was issued.

So long as the clutch engagement determination condition of step S305 remains unsatisfied, the control processing repeats steps S301, S303, S305, and S306 (in order as listed) of the flowchart shown in FIG. 12, thus continuing the steering holding control. Afterwards, the clutch 5 enters an engaged state and the operating torque increases. When the operating torque exceeds the prescribed value A, the control processing repeats steps S301, S303, S305, and S307 (in order as listed) of the flowchart shown in FIG. 12. In step S307, the apparatus switches from the steering holding control mode to an EPS control mode in which the steering motor 6 is used as an assisting force imparting section.

When the clutch engagement command is issued to the clutch 5 in step S304 of FIG. 12, the processing shown in the flowchart of FIG. 13 is executed. In the first control cycle, the steps S321, S323, S324, and S325 are executed in order as listed. In step S325, the prescribed amount of time B for which the reaction force control is continued after the clutch engagement command is issued is set based on the relative angular velocity between the driver operating unit and the steering unit.

Immediately after setting the prescribed amount of time B, control flows from step S325 to step S326 and then to step S322 of the flowchart shown in FIG. 13 because the prescribed amount of time B has not yet elapsed. In step S322, the reaction force control of the SBW control mode is executed normally.

Until the time condition of step S326 is satisfied, the control processing repeats steps S321, S323, S326, and S322 (in order as listed) of the flowchart shown in FIG. 13, thus continuing the reaction force control of the SBW control mode.

When the time condition of step S326 is satisfied, the control processing executes steps S321, S323, S326, and S327 (in order as listed) of the flowchart shown in FIG. 13. In step S327, the reaction force control of the SBW control mode is stopped.

Figure 15:
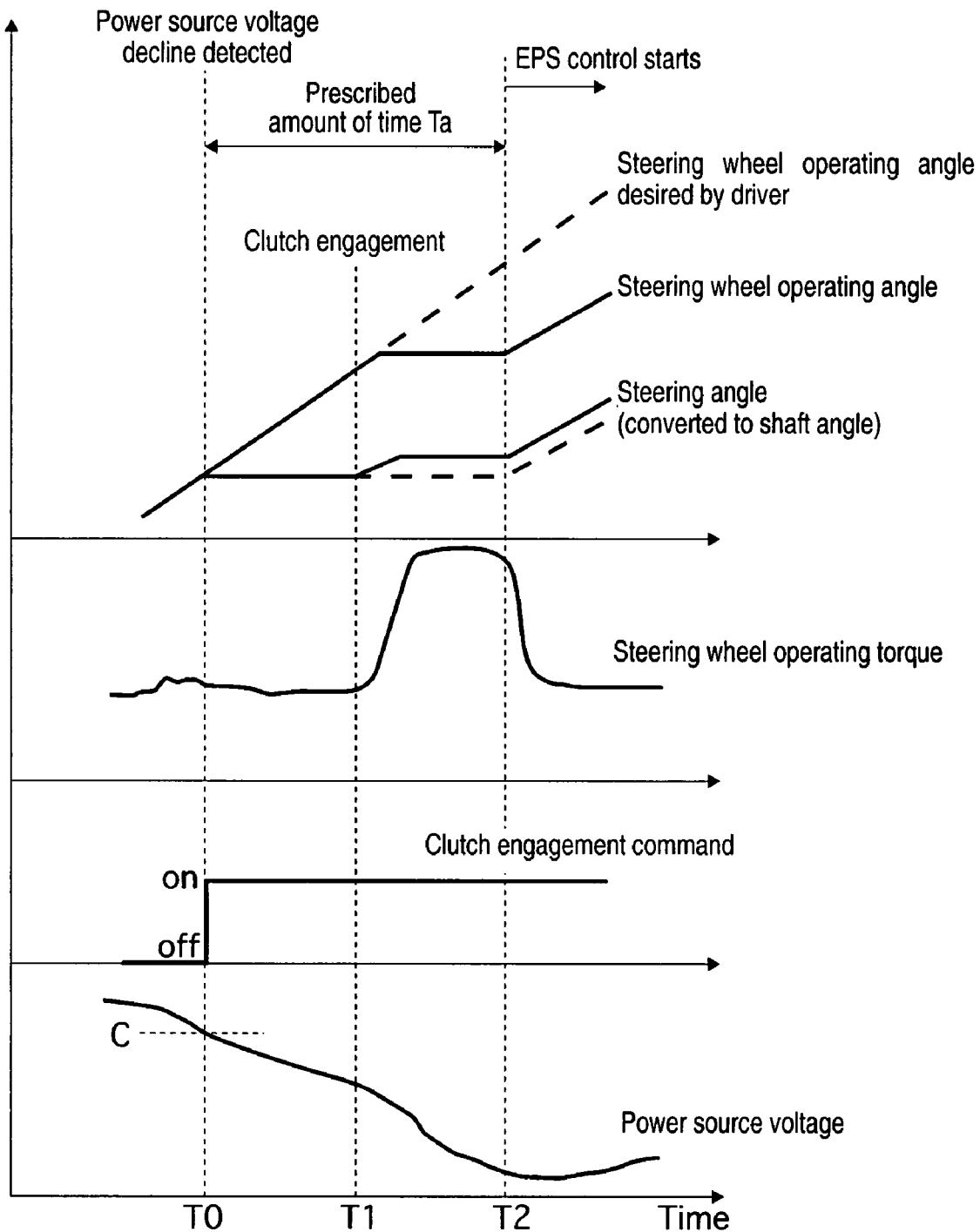
FIG. 15 is a time chart illustrating the operation of a conventional vehicle steering gear apparatus when the vehicle steering control apparatus switches from the SBW control to the EPS control due to the detection of a power source voltage decline.

The operation of switching from the SBW control to the EPS control when a power source voltage decline occurs in a conventional vehicle steering control apparatus will now be explained based on the time chart shown in FIG. 15.

In situations where the driver is turning the steering wheel 1 and the clutch 5 engages in an amount of time shorter than the prescribed time Ta while the steering wheel operating angle is increasing, the driver's ability to operate the steering wheel is inhibited because the steering angle continues to be held after the clutch 5 engages and a reaction force is generated that acts to hold the steering wheel (protruding portion of steering wheel operating torque characteristic). Furthermore, even though the apparatus switches from SBW control to EPS control in order to conserve electric power, the power source voltage declines even further during the period between the time T1 and the time T2 because the steering controller increases the current command value issued to the steering motor in order to hold the steering angle constant.

Figure 16:
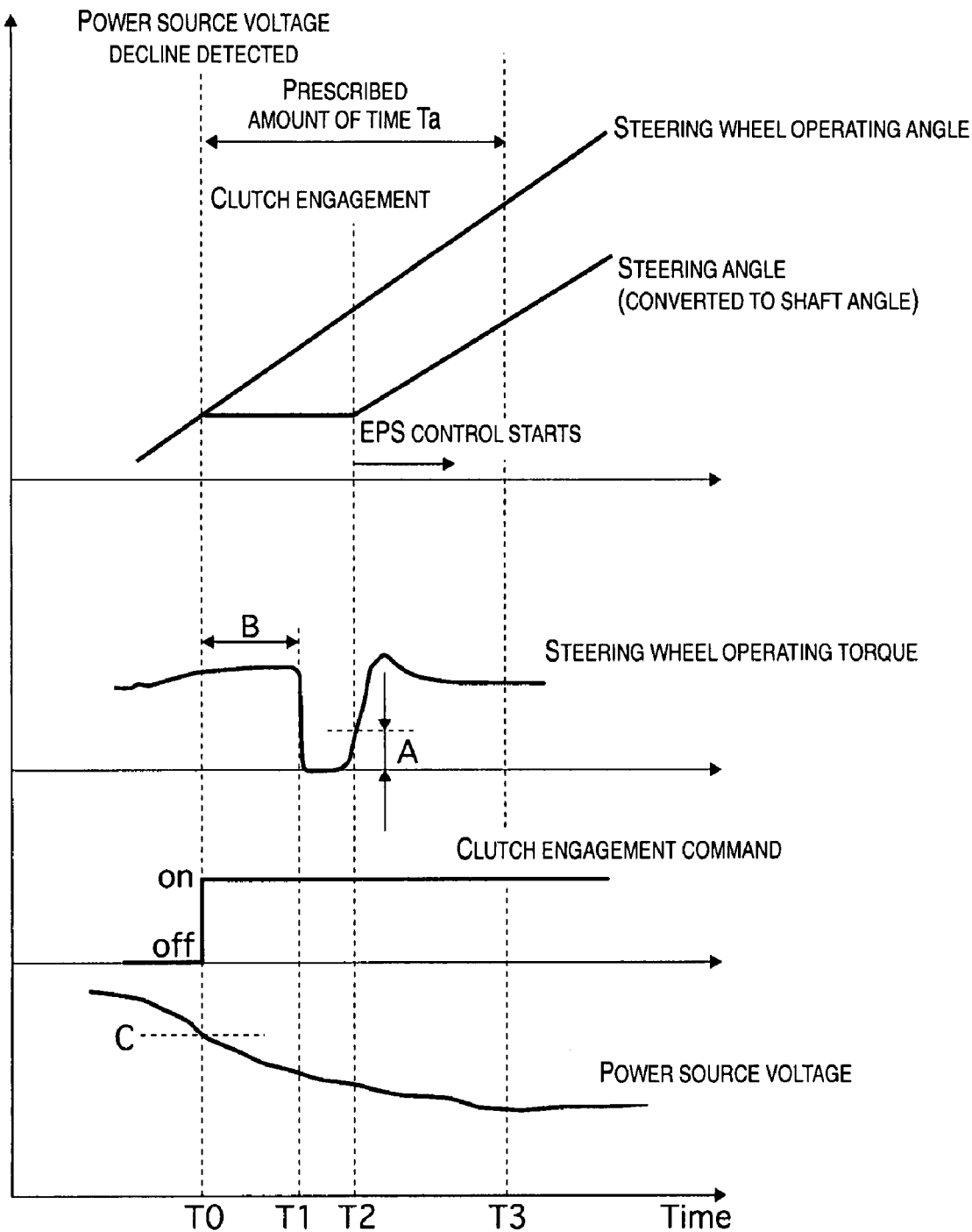
FIG. 16 is a time chart illustrating the operation of the third embodiment of the present invention when the vehicle steering control apparatus switches from the SBW control to the EPS control due to the detection of a power source voltage decline.

The operation of switching from the SBW control to the EPS control when a power source voltage decline occurs in a vehicle steering control apparatus in accordance with the third embodiment will now be explained based on the time chart shown in FIG. 16. FIG. 16 illustrates the operation of the third embodiment in a situation where the driver is turning the steering wheel 1 and the clutch 5 engages in an amount of time shorter than the prescribed time Ta while the steering wheel operating angle is increasing.

At the time T0, the power source voltage falls below the prescribed value C an the clutch engagement command changes from OFF to ON. Also, a command steering angle is issued so as to hold the steering angle constant. At the time T1, i.e., when the prescribed amount of time B has elapsed since the clutch engagement command turned on, the reaction force controller 10 stops the reaction force control it had been executing theretofore. As a result, after the time T1, the steering wheel operating torque goes to substantially zero. When the clutch 5 engages, a force is transmitted from the road surface to the steering wheel 1 through the clutch 5 and the operating torque increases, as described previously. When the operating torque exceeds the prescribed value A at the time T2, the apparatus determines that the clutch 5 is engaged and switches from steering holding control mode to EPS control mode. The command steering angle is then changed from the held value to a value calculated based on the EPS control. As a result, after the clutch engagement time T2, the driver's operation of the steering wheel 1 is reflected in the steering angle and the operation reaction force is generated normally, enabling normal, smooth steering wheel operation.

As a result of this operational configuration, the engagement of the clutch 5 can be determined based on the operating torque at the driver operating unit (steering wheel 1) without being affected by variations of the clutch engagement time. Thus, the problem of the previously described conventional technology, i.e., the problem of the driver's ability to operate the steering wheel being inhibited, can be resolved.

Since the reaction force control is stopped after the prescribed amount of time B has elapsed since the clutch engagement command was issued, a lapse of reaction force can be prevented from occurring during the period from when the clutch engagement command is issued until the prescribed amount of time B has elapsed and, after the prescribed amount of time B has elapsed, the change in torque that results from the clutch engagement can be detected without the need to take into account torque changes resulting from the reaction force control.

By basing the prescribed amount of time B on the relative angular velocity so as to accommodate the variation of the clutch engagement time, the amount of time that the reaction force is not generated can be set appropriately in accordance with the amount of time required for the clutch 5 to engage. As a result, the amount of time during which the reaction force is omitted, i.e., the amount of time during which there is a possibility that the steering wheel 1 will be operated through a larger amount than the driver intends, can be held to a minimum so as to suppress the occurrence of situations in which the steering feels unnatural to the driver.

The effects of the third embodiment will now be explained.

In addition to the effects obtained with the first embodiment, a vehicle steering control apparatus in accordance with the third embodiment achieves the effects listed below.

(9) A vehicle steering control apparatus in accordance with the third embodiment is provided with a second failure determining section (step S301) configured to determine if a steering system failure has occurred while the reaction force control system is normal (e.g., when a failure has occurred somewhere other than in the reaction force control system), and the clutch engagement command issuing section (step S304) is configured to issue an engagement command to the clutch 5 based on a determination that a steering system failure has occurred while the reaction force control system is normal. The apparatus is further provided with a reaction force control stopping section (FIG. 13) configured to stop the reaction force control of the SBW control mode when a prescribed amount of time B elapses after the clutch engagement command issuing section issues the engagement command. As a result, a lapse of reaction force can be prevented from occurring during the period from when the clutch engagement command is issued until the prescribed amount of time B elapses and the clutch engagement can be determined accurately based on the operating torque without the need to take the existence of a reaction force into account.

(10) The reaction force control stopping section (FIG. 13) is configured to set the prescribed amount of time such that the faster the relative angular velocity between the driver operating unit and the steering unit is, the shorter the prescribed amount of time becomes (step S325). As a result, the amount of time during which the reaction force is not generated can be set appropriately in accordance with the clutch engagement time and, thus, the amount of time during which the reaction force is omitted can be held to a minimum so as to suppress the occurrence of situations in which the steering feels unnatural to the driver.

Figure 17:
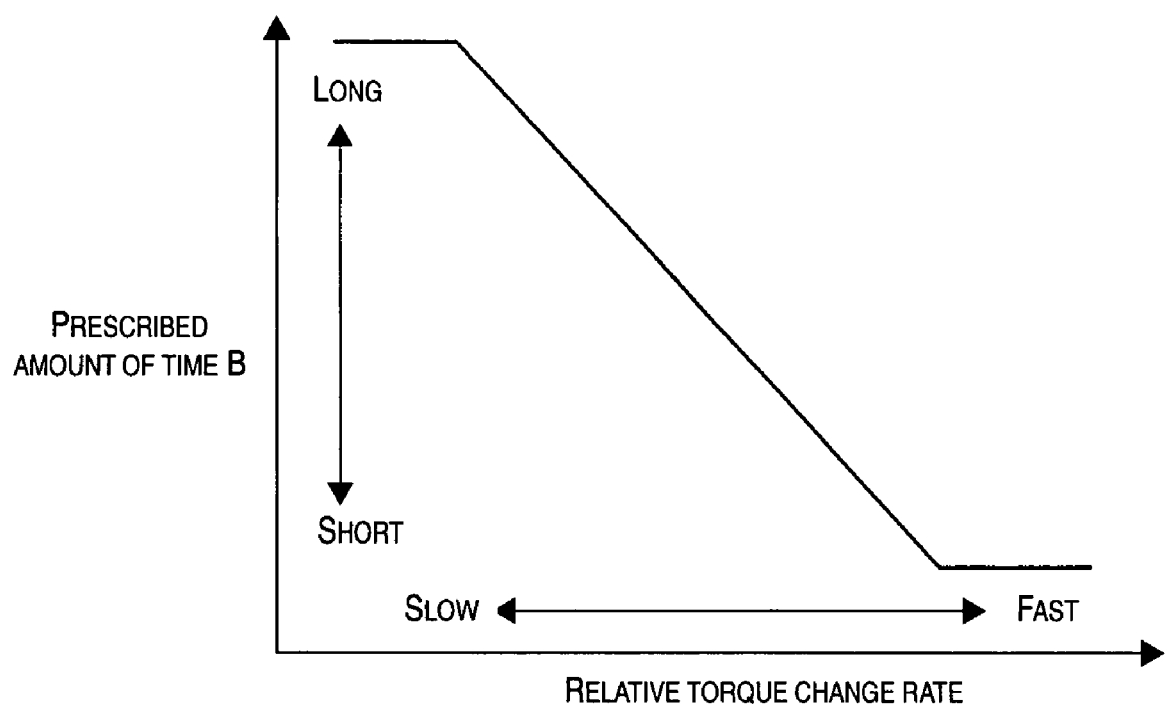
FIG. 17 is an example of a map of the relationship between the relative torque change rate and the prescribed amount of time B used in order to set the prescribed amount of time B during the reaction force stop processing of the third embodiment of the present invention.

In the third embodiment, the prescribed amount of time B for stopping the reaction force control is set such that the faster the relative angular velocity between the driver operating unit and the steering unit is, the shorter the value of the time B becomes. However, it is also possible to set the prescribed amount of time B based on the relative torque change rate between the driver operating unit and the steering unit, as shown in FIG. 17, instead of the relative angular velocity.

Fourth Embodiment

The constituent features of the fourth embodiment are the same as those of the first embodiment shown in FIGS. 1 to 2 and explanations and drawings thereof are omitted for the sake of brevity.

Figure 18:
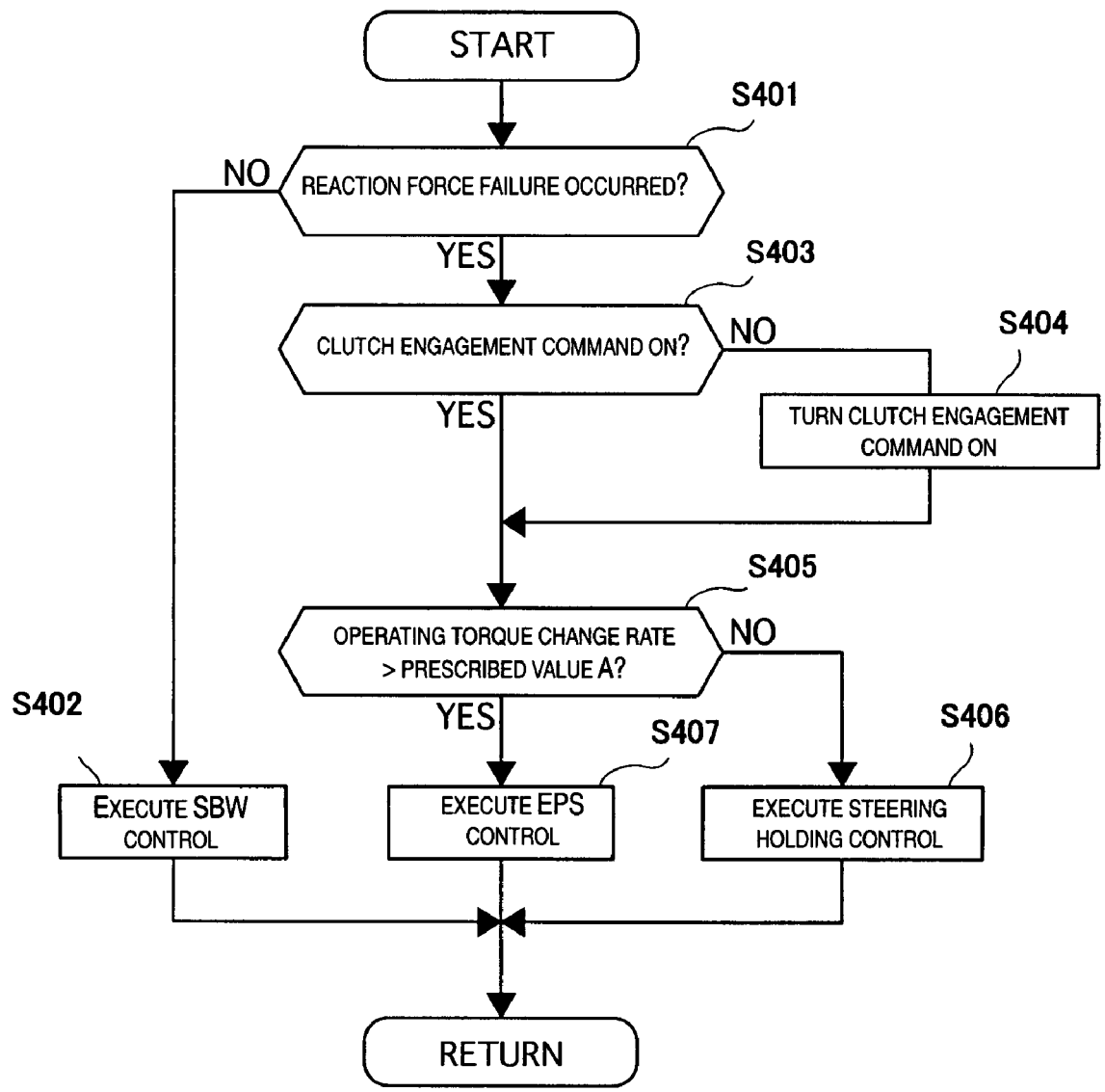
FIG. 18 is a flowchart showing the control processing executed by the reaction force controller and the steering controller of a fourth embodiment of the present invention in order to switch the control mode when a reaction force component failure occurs.

In the first embodiment, after the engagement command is issued to the clutch 5, the clutch engagement determining section determines that the clutch 5 has entered an engaged state when the operating torque detected by the torque sensor 3 exceeds a prescribed value A (clutch engagement determination threshold value). However, it is also acceptable to determine that the clutch has engaged when a derivative of the operating torque (rate of change of the operating torque) exceeds a clutch engagement determination threshold value, as shown in FIG. 18 (step S405).

Steps S401 to S404 and steps S406 and S407 are the same as steps S101 to S104 and steps S106 and S107, respectively, of the flowchart 3 and explanations there of are omitted for the sake of brevity.

In this patent specification, vehicle steering control apparatuses in accordance with the present invention are explained based on the first to fourth embodiments. However, the specific constituent features of the invention are not limited to those of the embodiments. Various design modifications and additions can be made so long as they do not depart from the scope of the invention as described in the appended claims.

In short, regarding the clutch engagement determining section, any section of determining that the clutch is engaged when an increase in operating torque is detected at the driver operating unit after the engagement command is issued to the clutch is included within the scope of the present invention.

Although the first to fourth embodiments exemplify cases in which the invention is applied to a steer-by-wire system provided with only a clutch as a backup mechanism, the present invention can also be applied to SBW systems having, for example, a clutch and a backup cable. In short, the present invention can be applied to any vehicle steering control apparatus in which a driver operating unit and a steering unit are separated by releasing a clutch and a steer-by-wire control is executed which is contrived to issue a control command that drives a steering actuator such that a steering angle corresponding to the operating torque of the driver operating unit is achieved by the steering unit and a control command that drives a reaction force actuator such that an operation reaction force corresponding to the steering state of the steering unit is imparted to the driver operating unit.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle steering control apparatus comprising:
    a driver operating unit configured to be operated by a driver;
    a steering unit arranged to be mechanically separated from the driver operating unit and configured to turn at least one steered wheel in response to an operating state from the driver operating unit;
    an operating torque detector operable to detect the operating torque applied to the driver operating unit;
    a clutch operable to mechanically connect and disconnect the driver operating unit and the steering unit to and from each other;
    a clutch engagement command issuing section configured to issue an engagement command to the clutch when the clutch is disengaged and a clutch engaging condition is satisfied; and
    a clutch engagement determining section configured to detect an increase in the operating torque applied to the driver operating unit after the engagement command has been issued to the clutch, and the clutch engagement determining section further configured to determine that the clutch is in an engaged state based on the detection of the increase from a first torque amount to a second torque amount that is larger than the first torque amount in the operating torque applied to the driver operating unit.

2. The vehicle steering control apparatus recited in claim 1, further comprising:
    a clutch engagement determination threshold value setting section configured to set a clutch engagement determination threshold value,
    the clutch engagement determining section is further configured to determine that the clutch is in the engaged state when an operating torque detection value from the operating torque detector exceeds the clutch engagement determination threshold value after the engagement command has been issued to the clutch.

3. The vehicle steering control apparatus recited in claim 2, further comprising
    a relative angular velocity detector configured and arranged to detect a relative angular velocity between the driver operating unit and the steering unit,
    the clutch engagement determination threshold value setting section being further configured to set the clutch engagement determination threshold value such that the faster the relative angular velocity is, the smaller the clutch engagement determination threshold value is.

4. The vehicle steering control apparatus recited in claim 2, further comprising
    a relative torque change rate detector configured and arranged to detect a relative torque change rate between the driver operating unit and the steering unit,
    the clutch engagement determination threshold value setting section being further configured to set the clutch engagement determination threshold value such that as the relative torque change rate increases, the clutch engagement determination threshold value becomes smaller.

5. The vehicle steering control apparatus recited in claim 2, further comprising
a relative angular velocity detector configured and arranged to detect a relative angular velocity between the driver operating unit and the steering unit;
a relative torque change rate detector configured and arranged to detect a relative torque change rate between the driver operating unit and the steering unit;
a first clutch engagement determination threshold value setting section configured to set a relative angular velocity threshold value such that as the relative angular velocity increases, the relative angular velocity threshold value becomes smaller; and
a second clutch engagement determination threshold value setting section configured to set a relative torque change rate threshold value such that as the relative torque change rate increases, the relative torque change rate threshold value becomes smaller,
the clutch engagement determining section is further configured to set the clutch engagement determination threshold value to whichever of the relative angular velocity threshold value and the relative torque change rate threshold value is smaller.

6. The vehicle steering control apparatus recited in claim 1, further comprising
an operating torque change rate detector configured and arranged to detect a change rate of the operating torque; and
a clutch engagement determination threshold value setting section configured to set a clutch engagement determination threshold value,
the clutch engagement determining section being further configured to determine that the clutch is in the engaged state when an operating torque change rate detection value from the operating torque change rate detector exceeds the clutch engagement determination threshold value after the engagement command has been issued to the clutch.

7. The vehicle steering control apparatus recited in claim 1, further comprising
a first failure determining section configured to detect if a reaction force component failure has occurred; and
a clutch engagement transitional steering controller configured to switch from a steer-by-wire control to a vehicle behavior suppressing steering control during a period from when the engagement command is issued in response a determination to that the steering reaction force component failure has occurred until the clutch engagement determining section determines that the clutch is in the engaged state.

8. The vehicle steering control apparatus recited in claim 7, wherein
the clutch engagement transitional steering controller is further configured to maintain a steering angle that existed at a point in time when the clutch engagement command issuing section issued the engagement command to the clutch.

9. The vehicle steering control apparatus recited in claim 7, wherein
the clutch engagement transitional steering controller is further configured to set a steering gear ratio to a slow gear ratio when the clutch engagement command issuing section issues an engagement command to the clutch.

10. The vehicle steering control apparatus recited in claim 9, wherein
the clutch engagement transitional steering controller is further configured to set the steering gear ratio such that as an operating angular velocity applied to the driver operating unit increases, the steering gear ratio becomes slower.

11. The vehicle steering control apparatus recited in claim 9, wherein
the clutch engagement transitional steering controller is further configured to hold the steering gear ratio fixed during a period from when the engagement command is issued until the clutch is determined to be in the engaged state.

12. The vehicle steering control apparatus recited in claim 1, further comprising:
a second failure determining section configured to determine if a failure has occurred while a reaction force control system is normal; and
a reaction force control stopping section configured to stop the reaction force control of a steer-by-wire control when a prescribed amount of time has elapsed since the engagement command was issued based on a determination that the failure has occurred while the reaction force control system is normal.

13. The vehicle steering control apparatus recited in claim 12, further comprising
a relative angular velocity detector configured and arranged to detect a relative angular velocity between the driver operating unit and the steering unit,
the reaction force control stopping section is further configured to set the prescribed amount of time such that as the relative angular velocity increases, the prescribed amount of time becomes shorter.

14. The vehicle steering control apparatus recited in claim 12, further comprising
a relative torque change rate detector configured and arranged to detect a relative torque change rate between the driver operating unit and the steering unit,
the reaction force control stopping section is further configured to set the prescribed amount of time such that as the relative torque change rate increases, the prescribed amount of time becomes shorter.

15. A vehicle steering control apparatus comprising:
steering input means for receiving a steering operation from a driver;
turning means for turning at least one steered wheel in response to an operating state from the steering input means;
operating torque detecting means for detecting an operating torque applied to the steering input means; and
engagement means for mechanically connecting and disconnecting the steering input means to the turning means to and from each other;
engagement command issuing means for issuing an engagement command to the engagement means when the engagement means is disengaged and an engaging condition is satisfied; and
engagement determining means for detecting an increase in the operating torque applied to the steering input means after the engagement command has been issued to the engagement means, and for further determining that the engagement means is in an engaged state based on the detection of the increase from a first torque amount to a second torque amount that is larger than the first torque amount in the operating torque applied to the steering input means.

16. A vehicle steering control method comprising:

providing a driver operating unit configured to be operated by a driver to input an operating torque to a steering unit that is configured to turn at least one steered wheel, with a clutch selectively operable to mechanically connect and disconnect the driver operating unit and the steering unit to and from each other to selectively transmit the operating torque to the steering unit;

detecting the operating torque applied by the driver to the driver operating unit; and issuing an engagement command to the clutch when the clutch is disengaged and a clutch engaging condition is satisfied;

detecting an increase in the operating torque applied to the driver operating unit after the engagement command has been issued to the clutch; and determining that the clutch is in an engaged state based on the detection of the increase from a first torque amount to a second torque amount that is larger than the first torque amount in the operating torque applied to the driver operating unit.

* * * * *